(12) United States Patent
Cherry

(10) Patent No.: US 7,082,409 B1
(45) Date of Patent: Jul. 25, 2006

(54) FULLY INTEGRATED ON-LINE INTERACTIVE PURCHASING CLUB INCORPORATING EXTREMELY RAPID FULFILLMENT

(75) Inventor: Richard Sutton Cherry, 10275 Collins Ave., #1531, Bal Harbour, FL (US) 33154

(73) Assignee: Richard Sutton Cherry, Miami, FL (US)

( * ) Notice: Subject to any disclaimer, the term of this patent is extended or adjusted under 35 U.S.C. 154(b) by 865 days.

(21) Appl. No.: 09/721,139

(22) Filed: Nov. 22, 2000

(51) Int. Cl.
*G06Q 30/00* (2006.01)

(52) U.S. Cl. .................................................. 705/26

(58) Field of Classification Search ................ 705/26, 705/27, 16, 20, 22, 28, 29; G06F 17/60
See application file for complete search history.

(56) References Cited

U.S. PATENT DOCUMENTS

| 6,260,024 B1 * | 7/2001 | Shkedy ......................... 705/37 |
| 6,351,738 B1 * | 2/2002 | Clark ........................... 705/37 |
| 6,587,835 B1 * | 7/2003 | Treyz et al. ................... 705/14 |
| 6,628,307 B1 * | 9/2003 | Fair ............................ 715/763 |

(Continued)

FOREIGN PATENT DOCUMENTS

EP          1071026     *   7/2000

(Continued)

OTHER PUBLICATIONS

Gregory Dalton, Software vendors create more hybrid applications . . . , Information Week, p. 101, Apr. 4, 1998.*

(Continued)

*Primary Examiner*—Mark Fadok
(74) *Attorney, Agent, or Firm*—Lott & Friedland, PA

(57) ABSTRACT

A method for implementing a computer-based product purchase and fulfillment club is disclosed, comprising the steps of designating one or more geographic club member areas; associating with each such club member area one or more consumer members who reside within the club member area and who must agree to pay a membership fee to the club; associating with each such club member area one or more buyer members who must be prepared to work within the club member area and who must agree to pay a membership fee to the club; associating with each such club member area one or more retailer members who must offer products for sale within the club member area and who must agree to pay a membership fee to the club; providing means through an electronic communications network for the consumer members, buyer members and retailer members to access a club web site specific to the club member area and to interact with the club web site; providing means through an electronic communications network for the consumer members, buyer members and retailer members to each access an individual member web page located on the club web site and personalized using parameters specific to each such consumer member, buyer member and retailer member; providing means through software programming for the retailer members to offer one or more products for sale on the club web site to the consumer members; providing means through software programming for the consumer members to purchase products offered for sale on the club web site; providing means through software programming for the buyer members to be notified of purchases made by the consumer members and to offer to the retailer members to fulfill the purchases; and fulfilling the purchases by having the buyer members buy the products from the retailer members, deliver the products to the consumer members to a location within the club member area within approximately thirty (30) minutes of the purchase, and collect a payment from the consumer members.

31 Claims, 21 Drawing Sheets

U.S. PATENT DOCUMENTS

| | | | |
|---|---|---|---|
| 6,631,356 B1 * | 10/2003 | Van Horn et al. | 705/26 |
| 6,658,568 B1 * | 12/2003 | Ginter et al. | 713/193 |
| 6,671,674 B1 * | 12/2003 | Anderson et al. | 705/26 |
| 6,728,685 B1 * | 4/2004 | Ahluwalia | 705/26 |

FOREIGN PATENT DOCUMENTS

| | | | |
|---|---|---|---|
| JP | 04340698 A | * | 11/1992 |
| JP | 06131386 A | * | 5/1994 |
| JP | 11149503 A | * | 6/1999 |

OTHER PUBLICATIONS

Unknown, Business marketing group and international franchise association announce team agreement,Business Wire, Jan. 22, 1999.*

Unknown,Accompany, Inc. to revolutionize commerce—buys come together for best value,(NewsAlert) from http://www.accompany.com, printed on Mar. 3, 1999.*

Anonymous, The Economist, Survey: E-commerce: Distribution Dilemmas, London, Feb. 26, 2000, vol. 354, Iss. 8159, p. S27. 4 pages.*

Anonymous. , "Cyber-Agent" Follow-Up: Employee Status Issues Clarified. 2 pages.*

Anonymous. , Ambitious Program Uses "Cyber-Agents" For Homebased Call-Center Work On Contract Basis. Telecommuting Review. Monmouth Junction: Dec. 1998. vol. 15, Iss. 12; p. 1 (7 pages).*

Edward Taylor, Sharon Cleary, E-Commerce (A Special Report): The lessons We've Learned—Groceries: Hungry fo Profits—Web sites offering grocery delivery, Wall Street Journal (Europe). Brussels: Oct. 23, 2000, 5 pages.*

Sarah Duran , Opportunity Rings; Willow Helps People, Including Disabled, Work At Home As Phone Operators.; [Broward Metro Edition] Special To The Sun-Sentinel. Sun Sentinel. Nov. 25, 1998. p. 1.D, 4 pages.*

Mark Albright , Home Operators Are Standing By; [South Pinellas Edition] St. Petersburg Times. St. Petersburg, Fla.: Mar. 28, 1999. p. 1.H, 4 pages.*

Erik Lounsbury , A Panoramic View Of What's High-Tech In Florida Call Center Crm Solutions. Apr. 2000. vol. 18, Iss. 10; p. 92. 5 Pages.*

Marcia Heroux Pounds, 2 Companies' Creativity Helps Both Workers, Society; [Final Edition] Business Strategies, Su Sentinel. Fort Lauderdale: Feb. 6, 1998. p. 3.D. 3 pages.*

Emily Narvaes , Online Fare Web Grocer To Deliver From Stapleton Warehouse; [Rockies Edition]. Denver Post Business Writer. Denver Post. Denver, Colo.: Jan. 8, 2000. p. C.01. 3 pages.*

Williams, Mina. , B2b: E-Commerce Brings New Opportunities For Grocers Canadian Grocer. Toronto: May 2000. vol. 114, Iss. 4; p. 51. 8 pages.*

Ken Cottrill., The Last Mile; [Tw Edition]. Journal Of Commerce. New York: Apr. 17, 2000. p. 19. 4 pages.*

Marcia Pledger, No More Crowded Aisles Clevelanders Could Be Shopping For Groceries Online Soon, But Stores St Figuring Economics; [Final / All Edition] Plain Dealer Reporter. The Plain Dealer. Cleveland, Ohio: Mar. 5, 2000. p. 1.H. 4 pages.*

Business Editors. , Webvan Announces 1999 Fourth-Quarter & Year-End Results; Unveils Rapid Expansion Strategy To Enter 15 Markets In 24 Months. Business Wire. New York: Jan. 27, 2000. p. 1. 5 pages.*

Clyde E Witt. , Update: Material Handling In The Food Industry Material Handling Engineering. Oct. 1999. vol. 54, Iss. 11; p. 38. 10 pages.*

Melinda Fulmer, The Cutting Edge Special Report: E-Commerce; Groceries; Feeling Like Mother Hubbard? Click Her [Home Edition] Los Angeles Times. Los Angeles, Calif.: Sep. 30, 1999. p. 9, 2 pages.*

Clinton Wilder. , What Business Are You In? Informationweek. Manhasset: May 29, 2000. p. Rb4. 6 pages.*

Stouffer, Barry, Internet-Based Consumer Solutions, Online Grocery Shopping, JC Bradford & Company, Equity Research, Oct. 1999.*

Coriolis Research, EGrocery: Evolution, Revolution or Hallucination? Nov. 2000.*

Bernie Knill, Systems Integration moves out of the factory. Material Handling Engineering, No. 5, vol. 52, p. 55. May 1997. 4 pages.*

Kathleen Hickey, Journal of Commerce, Oct. 12, 1998. HK Broadens Reach. p. 43. 2 pages.*

James Cook, Endangered species, Logistics Management Distribution Report, Dec. 31, 1998, No. 1, vol. 37, p. 57. 3 pages.*

Bernie Knill, AS/RS Retrofit or replace automated storage and retrieval system. . Material Handling Engineering, No. 8, vol. 54, p., 71. Aug. 1, 1999. 5 pages.*

Chicago Tribune, Crackdown on violators of child labor laws draws criticism from legislator Lantos labels action a PR extravagansa, Oranfe County Register, Mar. 17, 1990.*

Johnson, Harriet, Delivering the goods; House calls have found a home, USA Today, Aug. 25, 1988.*

* cited by examiner

FULLY INTEGRATED ON-LINE INTERACTIVE PURCHASING CLUB INCORPORATING EXTREMELY RAPID FULFILLMENT

TECHNICAL FIELD

The present invention relates to fulfillment and on-line shopping. More particularly, the present invention relates to an on-line shopping club that integrates extremely rapid fulfillment with on-line shopping convenience.

BACKGROUND OF THE INVENTION

On-line shopping programs have been developed by numerous wholesalers ('Business to Business' services) and retailers ('Business to Consumer' services). A percentage of these sellers are seeking to provide themselves a presence on the World Wide Web in addition to a traditional physical store front in an attempt to attract a wider, and perhaps different, consumer market. In recent years a new type of service provider has emerged that exists only as a presence on the World Wide Web to provide brokerage services between retailers and consumers.

The success of these service providers has been hampered by the relative newness of the concept among the mass of consumers, and often by the reliance on established courier companies for order fulfillment. Dependence upon traditional couriers (including the mail system), and lately upon third-party fulfillment warehouses catering to localized areas, but generally inconveniently located, is necessitated by the fact of the vast and undifferentiated fulfillment area characteristic of the World Wide Web. Long distance fulfillment by courier introduces lags on the order of days, and the time, and often the date, of product delivery are uncertain. Local deliveries tend to be subject to courier schedules, which are independent of the needs of the retailer and consumer.

Certain existing on-line business and technology models have been developed to cater to local markets, but these tend to depend on warehousing and hired drivers to source and deliver a narrowly defined product category; for example, groceries. Because of the narrowness of the product offering demanded by the warehousing constraint, the market area must be correspondingly broadened in hopes of obtaining trade volumes adequate to cover expenses, including expenses incurred by paid drivers. The broad market area incurs time lags and delivery is often scheduled, which although requiring planning on the part of the consumer, is preferable to the greater inconvenience of an uncertain delivery time.

Thus present models suffer from lengthy and uncertain delivery times, which increases the possibility of spoilage of perishable products and the likelihood of refusal or return of merchandise purchased on impulse, and hence discourages impulse shopping. The primary cause of unacceptable fulfillment times stems from too broad a market area, determined either by the characteristics of the World Wide Web itself or by the central warehousing of specialty items. Accordingly, none of the existing models describe an on-line shopping club that integrates extremely rapid fulfillment with on-line shopping convenience.

Consequently, there is a need in the art for an on-line, interactive purchasing environment providing a variety of psychologically attractive shopping experiences fully integrated with a rapid fulfillment strategy.

There is a further need in the art for an on-line, interactive purchasing environment with a broad product offering that is able to satisfy a larger proportion of a consumer's purchasing needs and that permits a reduction in its geographic market area in favor of rapid fulfillment by generating a proportionally greater amount of revenue.

There is a further need in the art for an on-line, interactive purchasing environment which permits its geographic market area to be broadened as desired by expanding on a cellular basis, whereby a member area serves a limited community within a radius of a selected geographic location, while a very large number of member areas can be served by the same on-line presence.

There is a further need in the art for an on-line, interactive purchasing environment in which self-employed, trained buyers perform fulfillment and earn their income solely from retailers, through volume discounts, and from consumers, through tariffs charged to the consumer based on product categories, delivery service fees and tips. The company brokering these purchases is not impacted by the cost of hiring delivery personnel or maintaining a fleet of vehicles.

Finally, there is yet a further need in the art for an on-line, interactive purchasing environment including a Geographic Information System to provide for the assignment of Buyer Members on the basis of their location, and to allow real-time, graphical observation of order fulfillment status by Consumer Members.

SUMMARY OF THE INVENTION

The present invention overcomes significant deficiencies in the art by providing a fully integrated club-based business-to-consumer model incorporating a novel rapid fulfillment strategy.

An Internet Portal links Consumer Members, Retail Members, Buyer Members and Proxy Members of the Club who are all located within a specific Member Area. The Club allows Consumer Members within a Club Area to purchase from all retailers, including Retail Members, within the same Club Area for delivery from local inventory usually within 30 minutes. The Club collects a nominal fee from Retailer Member, Buyer Member and Consumer Member for brokering each purchase transaction, in addition to receiving monthly membership fees from all Club Members. The Buyer Member benefits from delivery fees, Retailer Member discounts, gratuities and tariffs associated the product category. While all Buyer Member benefits are charged to the Consumer Member, Retailer Members are encouraged to lessen the charges by paying all, or a percentage, of these. The Consumer Member benefits from the convenience of on-demand delivery of all products available within the Member Area, usually in less time and always with less involvement than if the Consumer Member were to procure the products him or herself. The Consumer Member potentially further benefits from a relationship with a team of professional buyers who are trained to minimize the cost, and maximize the value, of most material goods and services of interest to the Consumer Member.

Generally, the present invention describes a method for implementing a computer-based product purchase and fulfillment club, comprising the steps of designating one or more geographic club member areas; associating with each such club member area one or more consumer members who reside within the club member area and who must agree to pay a membership fee to the club; associating with each such club member area one or more buyer members who must be prepared to work within the club member area and who must agree to pay a membership fee to the club; associating with each such club member area one or more retailer members who must offer products for sale within the club member area and who must agree to pay a membership fee to the club; providing means through an electronic communications network for the consumer members, buyer members and retailer members to access a club web site specific to the club member area and to interact with the club web site; providing means through an electronic communications network for the consumer members, buyer members and retailer members to each access an individual member web page located on the club web site and personalized using parameters specific to each such consumer member, buyer member and retailer member; providing means through software programming for the retailer members to offer one or more products for sale on the club web site to the consumer members; providing means through software programming for the consumer members to purchase products offered for sale on the club web site; providing means through software programming for the buyer members to be notified of purchases made by the consumer members and to offer to the retailer members to fulfill the purchases; and fulfilling the purchases by having the Buyer Members buy the products from retailers within the Member Area, including Retailer Members, deliver the products to the consumer members to a location within the club member area within approximately thirty (30) minutes of the purchase, and collect a payment from the consumer members.

Accordingly, it is an object of the present invention to provide an on-line, interactive purchasing environment providing a variety of psychologically attractive shopping experiences fully integrated with a rapid fulfillment strategy.

Another object of the present invention is to provide an on-line, interactive purchasing environment with a broad product offering that is able to satisfy a larger proportion of a consumer's purchasing needs and which permits a reduction in its geographic market area in favor of rapid fulfillment by generating a proportionally greater amount of revenue.

Another object of the present invention is to provide an on-line, interactive purchasing environment which permits its geographic market area to be broadened as desired by expanding on a cellular basis whereby a member area serves a limited community within a radius of a selected geographic location while a very large number of member areas can be served by the same on-line presence.

Another object of the present invention is to provide an on-line, interactive purchasing environment in which self-employed, trained buyers perform fulfillment and earn their income solely from retailers, through volume discounts, and from consumers, through tariffs charged to the consumer based on product categories, delivery service fees and tips. The company brokering these purchases is not impacted by the cost of hiring delivery personnel or maintaining a fleet of vehicles.

Another object of the present invention is to provide an on-line, interactive purchasing environment including a Geographic Information System to provide for the assignment of Buyer Members on the basis of their location, and to allow real-time, graphical observation of order fulfillment status by Consumer Members.

These and other objects, features and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
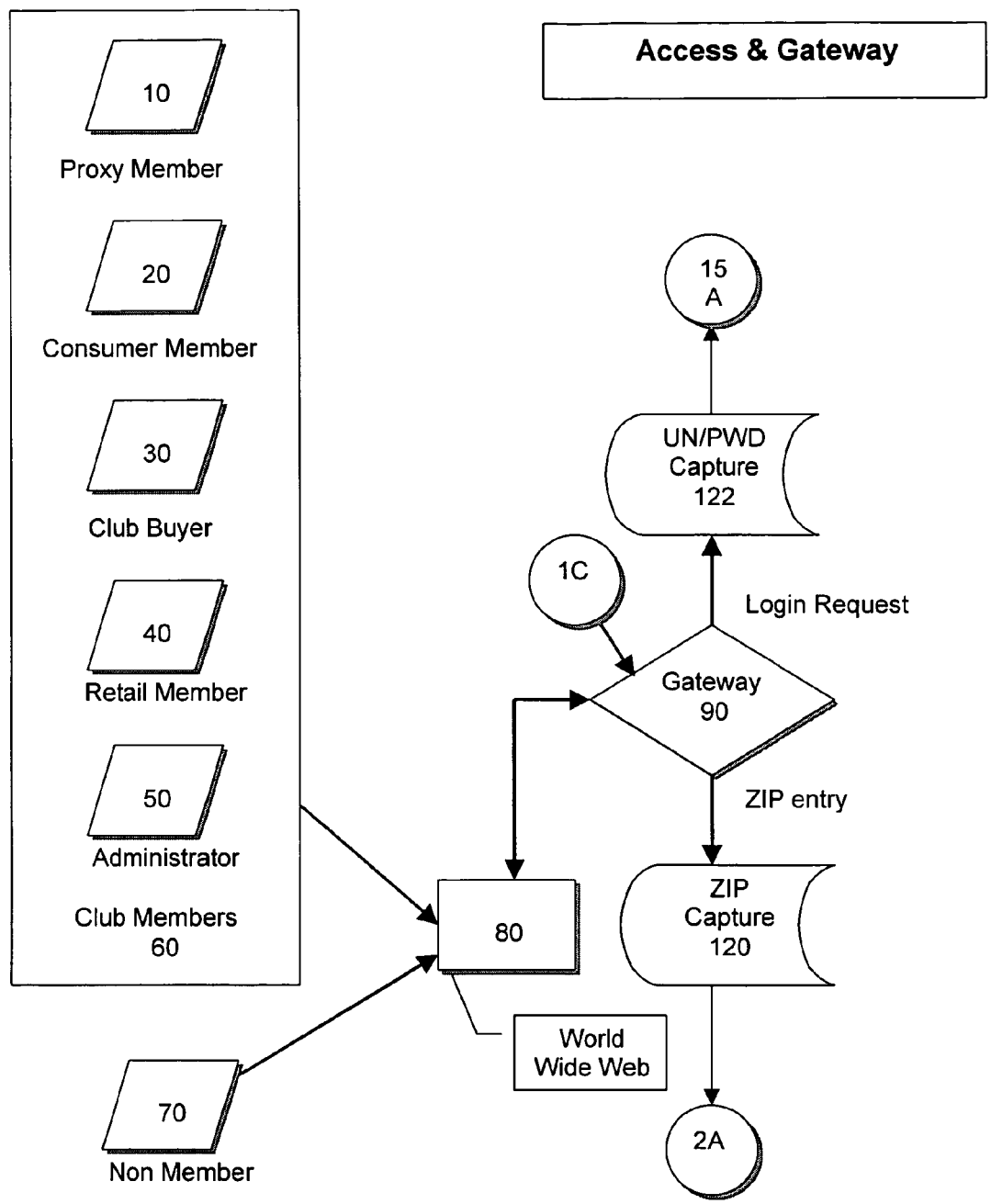
FIG. 1 is a flow chart illustrating the user access features of the Club described in the preferred embodiment of the present invention.

The system according to the present invention will be described with reference to FIGS. 1–21. FIG. 1 is a flow chart showing the access part of the purchase and fulfillment system, or "Club", via the World Wide Web, 80. 10 through 50 represent Club access by subscribing members of the Club, collectively referred to as "Club Members", 60. On the other hand, 70 represents system access by members of the general public who are non-subscribers of the system. Upon gaining access to the Club via the World Wide Web, 80, the Club presents both members and non-members with an initial screening program, the gateway page, 90. The purpose of the gateway, 90, is to restrict access to the benefits of the Club to Club Members and to steer non-members to a part of the Club that explains the benefits of membership in the Club, and that allows them to subscribe as members.

Figure 2:
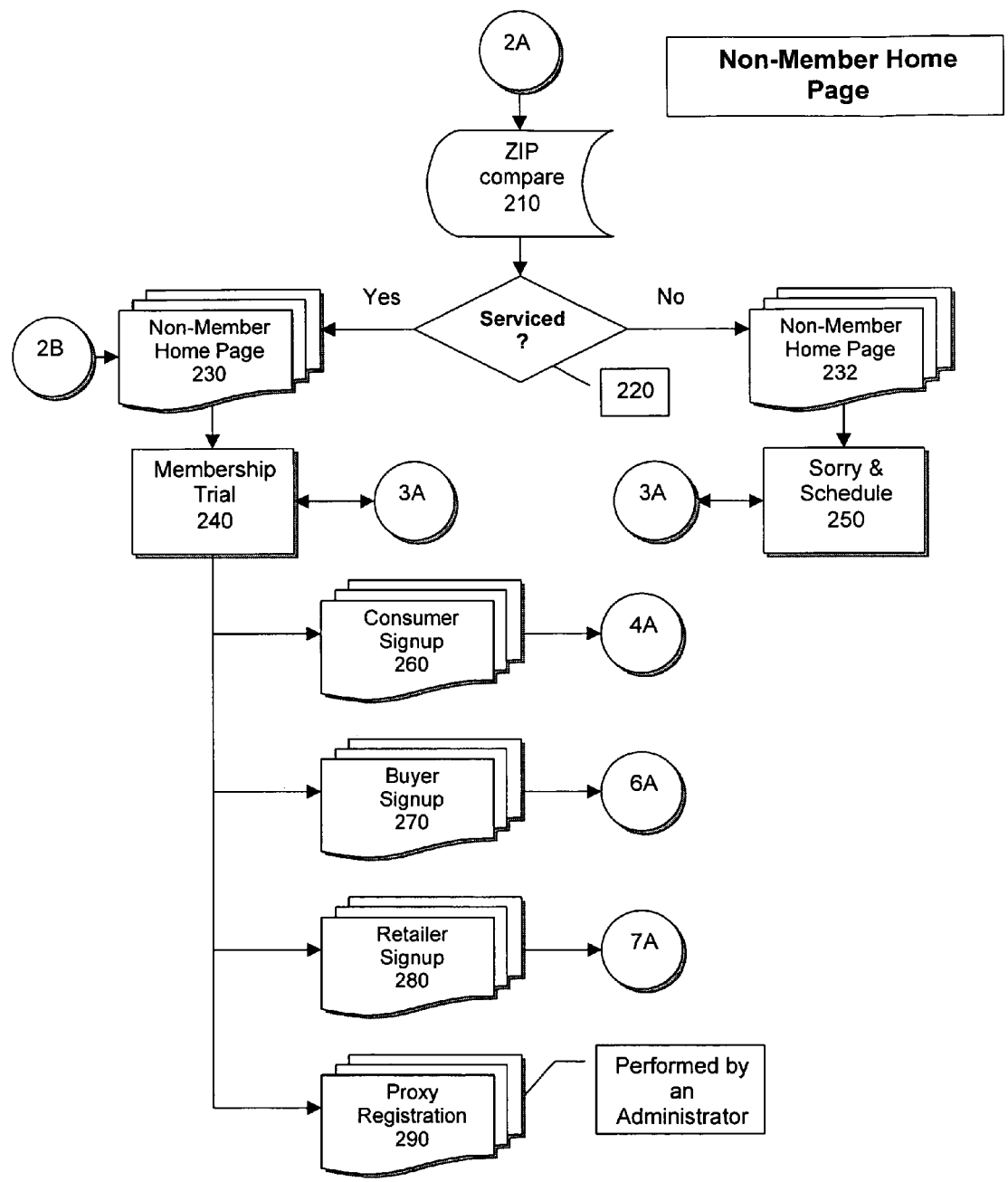
FIG. 2 is a flow chart illustrating the options available to non-members of the Club described in the preferred embodiment of the present invention.
Figure 3:
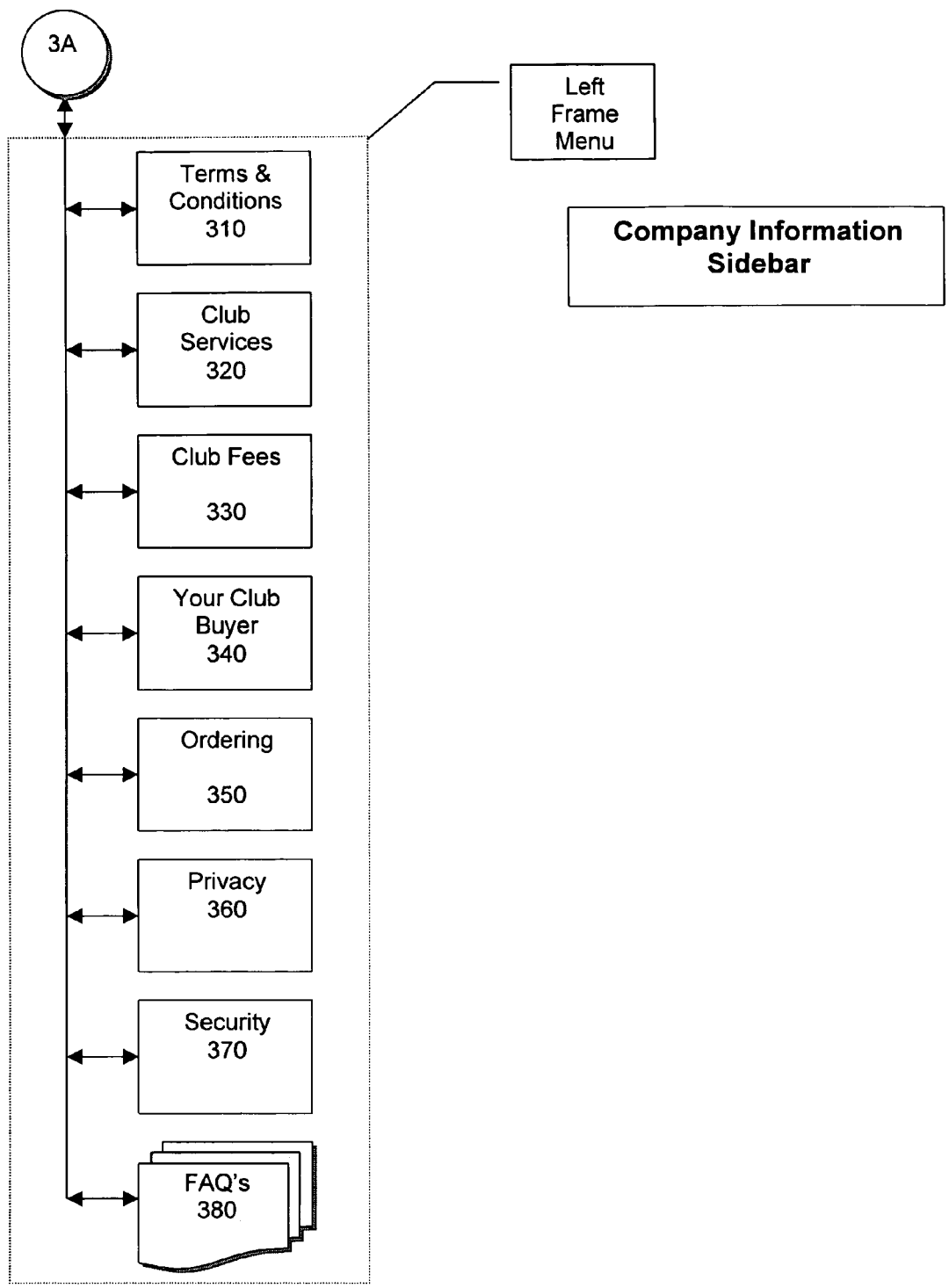
FIG. 3 is a flow chart illustrating the explanatory features of the Club described in the preferred embodiment of the present invention.

The Club gateway invites non-members to enter the ZIP code of their residence. Turning next to FIG. 2, upon receipt of the ZIP code, the Club captures the ZIP to a data persistence store, 120, determines whether the non-member resides in an area serviced by the Club (a "Member Area"), 210, and constructs a frames-based Web page based upon the result of the comparison, 220. The frames-based Web page comprises a top frame containing Club trademarked logo, a left-side frame containing an option menu and a center-right frame, the content of latter dependant upon the outcome of the said comparison. If the ZIP code entered by the non-member falls within a Membership Area, the Club presents the non-member with a center-right frame inviting him to become a member (the "Free 90-Day Trial Membership" frame content), 230. If the ZIP code entered by the non-member does not fall within a Membership Area, the Club presents the non-member will a center-right frame apologizing for the inconvenience and advising the non-member of ZIP codes that are scheduled to be serviced in the near future (the "Sorry" frame content), 232 and 250.

It should be noted that discrimination among potential Club Members on the basis of ZIP code constitutes an advantage of the preferred embodiment by implementing the criteria for approximate 30 minute fulfillment of Buying Orders placed by Consumer Members. The use of ZIP codes is an advantage of the preferred embodiment in that ZIP codes represent a convenient method whereby potential Club Members can approximately indicate whether or not they reside or do business within a Member Area. Extended ZIP codes determined from potential Member addresses further help constrain membership to a more geometrically regular Member Area; ideally a circle. Extended ZIP codes selected for inclusion within the Member Area are determined according to a formula by which an extended ZIP code is included if all or most of the geographic area defined by the extended ZIP code falls within a Member Area. In the preferred embodiment a Member Area is furthermore defined according to the following criteria:

Whether or not a geographic location can be discovered that provides a suitable site for rental or construction of a warehouse structure centrally located within the Member Area; which site is referred to as the Center of the Member Area, or Center;

Whether or not the population density and demographics within a specified radius of the Center is expected on the basis of statistics to yield a sufficient number of Consumer, Buyer and Retailer Members to support a stable and sufficient volume of Buying Order activity;

Whether or not the transportation infrastructure within a specific radius of the center supports the 30-minute Buying Order fulfillment;

Whether or not the wireless networking infrastructure within a specific radius of the center supports a method of mobile data communications, for the purpose of interacting with Club Buyers deployed within the Member Area; and, Whether or not market data suggest potential Members within the Member Area are likely to respond to active and passive recruitment programs defined by the Club business model.

Non-members who are thus eligible to apply for Club membership have two options; namely, of applying for Club membership, 240, and 260 through 280 depending upon the type of membership required, or of navigating the left-side frame menu to learn more about the Club (FIG. 3), 310 through 380. Non-members who are not eligible to apply for Club membership, on the basis of the ZIP code provided to the gateway subsystem, have a single option; namely, of navigating the left-side frame menu to learn more about the Club, 310 through 380.

In the preferred embodiment there is no mechanism to verify that a person choosing to enter a ZIP code is, in fact, a non-member. There is also no mechanism in the gateway subsystem to confirm that the ZIP code entered corresponds with the residence of the person having entered it. These circumstances are harmless to the Club, in and of themselves. However, since the operation of the Club involves exercise of Member's credit and/or debit facilities toward the purchase of goods and services, the following steps are taken in regard to any access of the gateway subsystem:

Independent of the present invention, all access of the gateway subsystem is logged together with a date and time stamp and IP address, whether or not this access is detectable by the gateway subsystem; i.e., whether or not they result in ZIP code or User Name and Password entry;

The Club logs all ZIP code entries, 120, with time and date stamps for marketing purposes but also against the possibility that any given access signals the beginning of an attempt to gain fraudulent access; and, The Club logs all User Name and Password entries, bona fide or not, 122, with time and date stamps for marketing purposes but also against the possibility that any given access signals the beginning of an attempt to gain fraudulent access.

Figure 4:
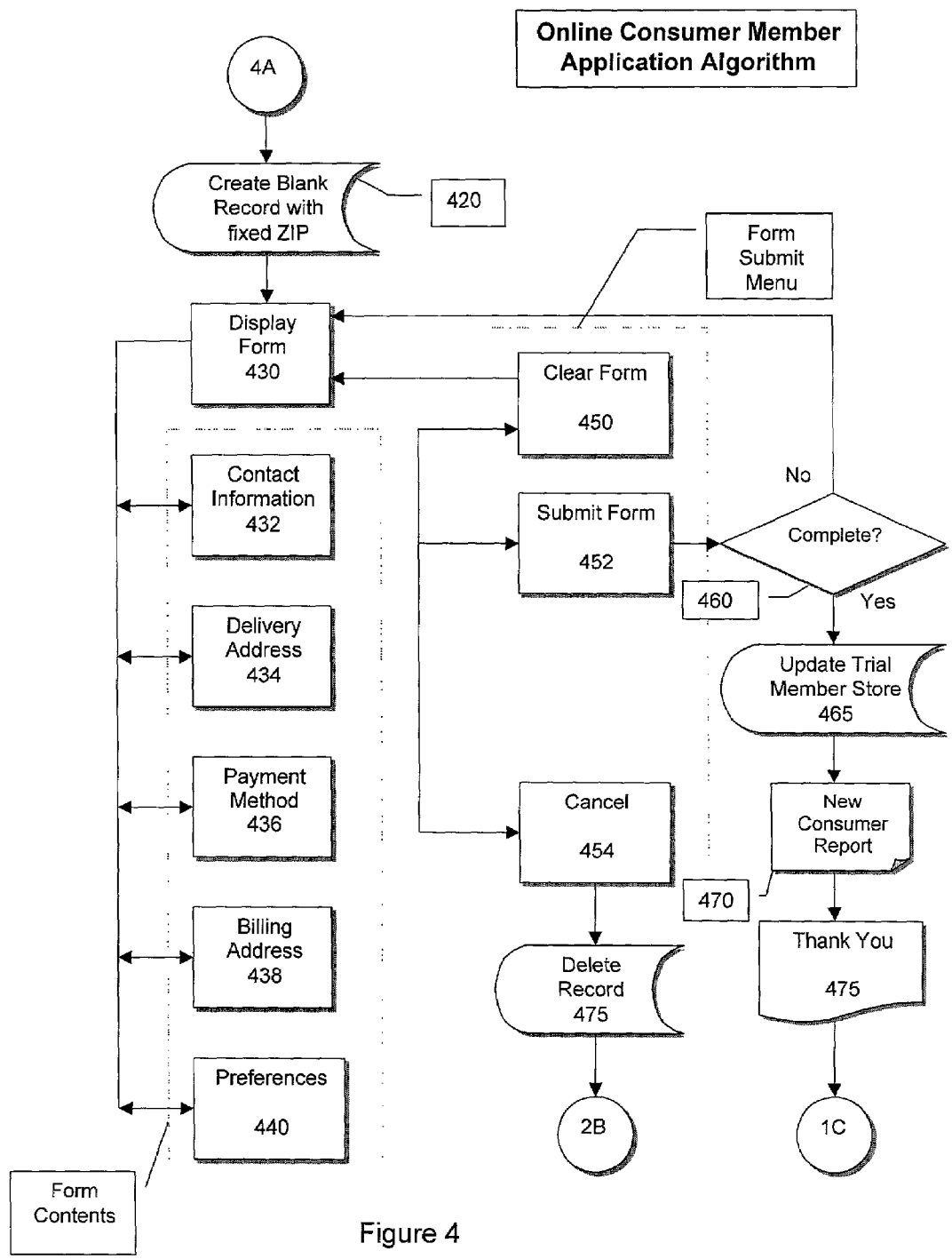
FIG. 4 is a flow chart illustrating the Consumer Member Application features of the Club described in the preferred embodiment of the present invention.
Figure 6:
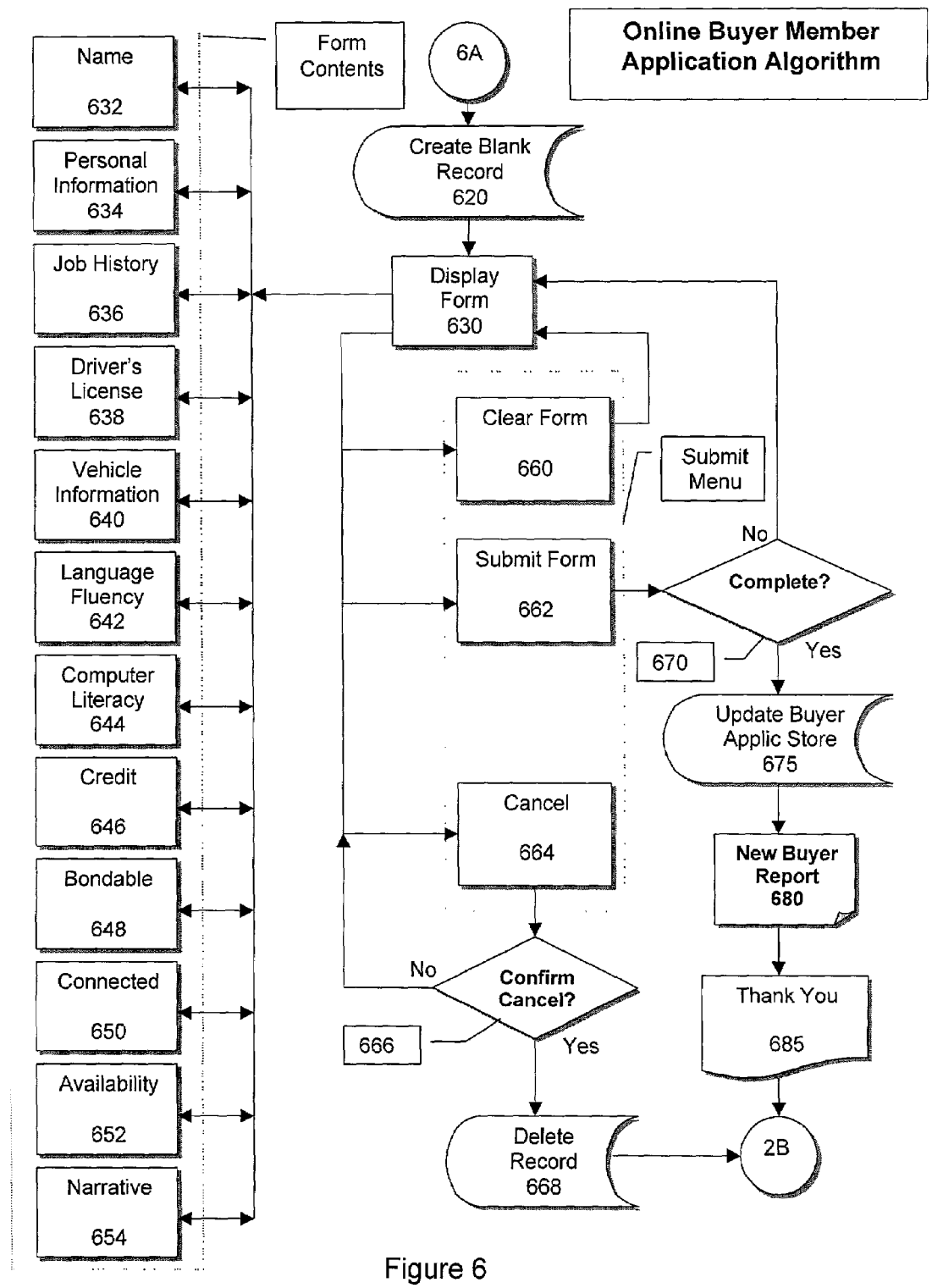
FIG. 6 is a flow chart illustrating the Buyer Member Application features of the Club described in the preferred embodiment of the present invention.
Figure 7:
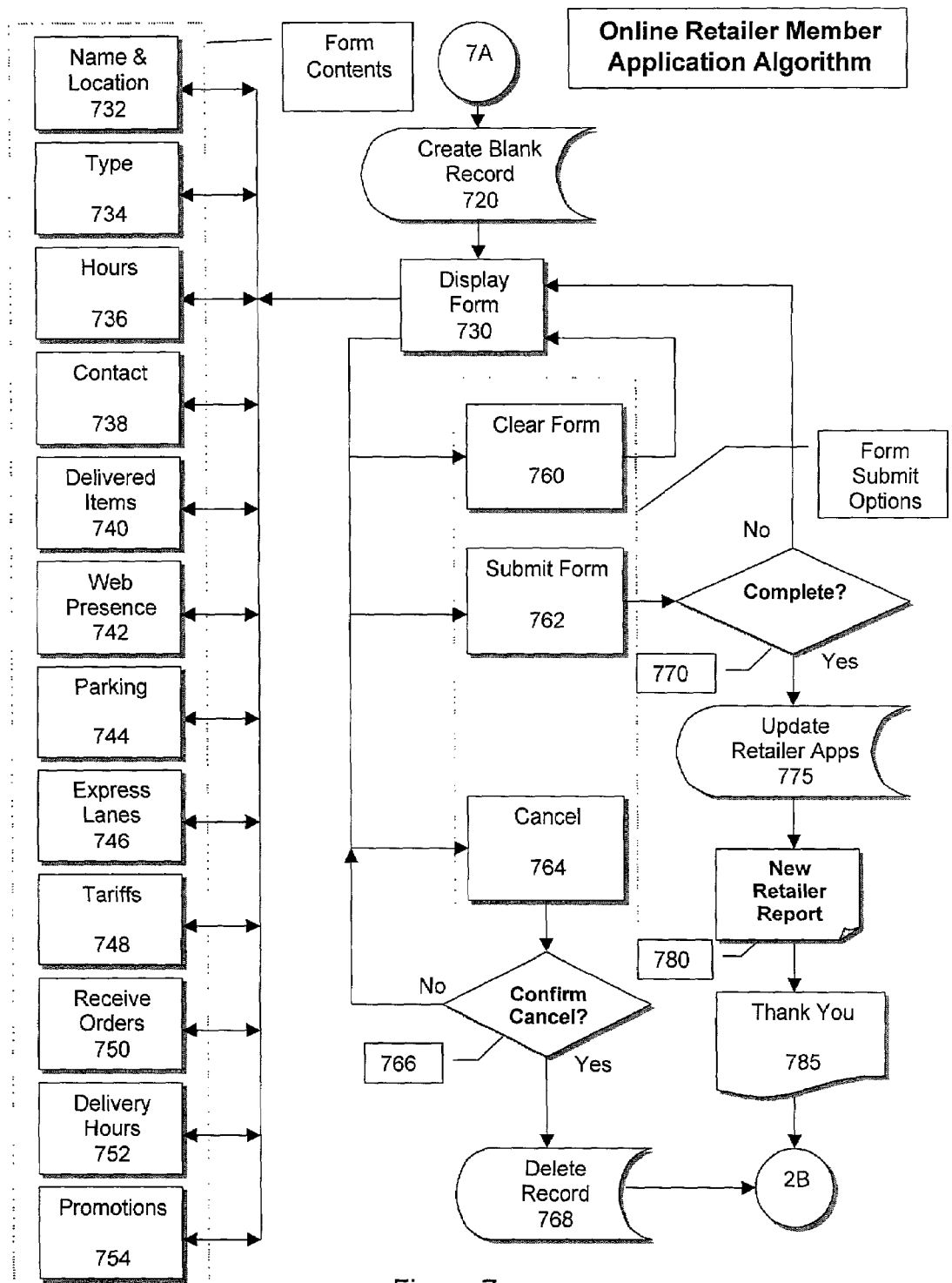
FIG. 7 is a flow chart illustrating the Retailer Member Application features of the Club described in the preferred embodiment of the present invention.

Persons initially qualifying to apply for membership in the Club, by virtue of residing in a ZIP code serviced by a Club Member Area, are guided through the application process by algorithms illustrated in FIGS. 4, 6 and 7, depending upon the potential member's intention to subscribe as a Consumer, Buyer or Retailer Member, respectively.

While the preferred embodiment of the present invention incorporates the foregoing methods to define the Member Area and constrain membership to the Member Area, the preferred embodiment also includes incentives to encourage membership of residents within the Member Area. In regard to incentives to Retailer Membership, by virtue of its design, the Club becomes a factor in a Member Area with which any given retailer in the Member Area eventually must come to terms. This is because the Club is a new market force that alters the balance of supply and demand established among existing retailers within the Market Area. The Club has the proven ability to target and substantially increase the revenues of retailers selected at the discretion of the Club, within the Member Area, by preferential choice of those retailers, above others within the same product category, to fulfill Buying Orders. The Club can, by similar means and at its discretion, also withdraw sales support for a retailer within a Member Area, once granted, with a corresponding negative impact on the retailer's improved revenues. Retailers come to associate this fluctuation in revenue with the regular shopping, and then the absence, of distinctively dressed Club Buyers within their places of business. In the preferred embodiment of the present invention, the Club does not directly solicit retailer membership, but rather encourages retailers to investigate the fluctuation in revenue associated with Club activity in the Member Area.

Support for retailers in a member area is initially indiscriminant, but becomes discriminating in favour of retailers who choose to become early Retailer Members of the Club. This discrimination is impersonal, in the sense that it reflects the way a given retailer is represented to a Consumer Member within the Club portal. During launch of the Club in a Member Area, initially as many non-member retailers as possible are targeted by the Club and highlighted to Consumer Members, to a greater or lesser degree, depending solely upon the discretion of the Club. A number of these non-member retailers are elected for special highlighting on all Consumer Member's Home pages, by inclusion of their names in the 30 Minute Mall retailer grid, discussed later. When a retailer becomes a Retailer Member of the Club, the Retailer Member receives privileges not afforded non-members, including the right to be specialty highlighted on all Consumer Members' Home pages in the 30-Minute Mall grid, at the expense of non-member retailers. The expense to non-members is by virtue of inclusion of the Retailer Member's logo in addition to the Retailer Member's name, and occasionally by virtue of replacement of a non-member retailer's name altogether in the grid, if the space required on the Home page to accommodate the new Retailer Member leaves insufficient room for the non-member. The new Retailer Member also earns the right to advertise on the Club portal. This lawful discrimination in favour of Retailer Member, which has the effect of first demonstrating improved revenues to non-member retailers and then reducing or withdrawing them, drives retailer membership of the Club. This form of incentive is the method whereby non-member retailers in a member area are converted to Retailer Members of the Club.

In the present embodiment, once a retailer has become a Retailer Member of the Club, further competition-based incentives are offered to Retailer Members by virtue of providing a platform for advertising, offering of coupons in regard to retailer special offers, and detailed descriptions of products offered for sale, including exact pricing, via local databasing of their inventory. The Club benefits from providing these services to retailer members through the collection of additional fees.

A further advantage of the membership incentives strategy in the preferred embodiment of the present invention is the incorporation of incentive to potential Club Buyers, who are offered a meticulously-developed plan for becoming self-employed businesspersons, with a clientele already established by the Club.

Turning to FIG. 4, when a potential member chooses to apply as a Consumer member, 260, the system creates a temporary data persistence object by virtue of constructing a Web browser form, 420, and transmitting it over the World Wide Web to the potential member's Web browser for presentation to the potential member, 430. The potential Consumer Member must enter appropriate data in all text entry boxes within the form, 432 through 440, as instructed by labels beside each text entry box on the form present by the browser. Among the data entered in the text boxes, the potential Consumer Member must enter an alphanumeric Username that is unique within a Member Area, a Password and challenge word in the Preferences section, 440. The selection of the unique Username is essentially trial and error, in that the potential Consumer Member has no way of knowing beforehand whether a given alphanumeric sequence is unique until he or she tests it. The Club advises the potential Consumer Member whether or not the suggested User Name is unique, by comparing the entry with all registered User Names within the Member Area. Unlike most, if not all, subscription services the preferred embodiment of the present invention permits the potential Consumer Member the advantage of testing Usernames independently of application submission. Also in the preferred embodiment, the potential Consumer Member is therefore advised to include some part, or all, of his or her phone number as part of the sequence of alphanumeric characters comprising the Username.

The Club provides for the use of e-mail addresses as Usernames. This option has the advantage that an e-mail address is unique across the entire World Wide Web, not only a member area, and is relatively easy for people to remember or to look up. It is essential that the Club Member remember his or her Username, because well-known strategies intended to allow the Club Member to recover access to his or her membership privileges provide only for a forgotten Password. In the event the Club Member cannot recall his or her Username, then the Club Member has no recourse but to re-subscribe to the Club. While the potential exists within the Club to identify the Club Member's original presence based upon exact matches between personal data, this feature is not provided as a service in the preferred embodiment.

While the Username is generally public, the potential Consumer Member is cautioned to choose a Password that someone else would have a great deal of trouble guessing, and yet is easily recalled by the him- or herself. The potential Consumer Member is cautioned to keep the chosen Password private to him- or herself.

After entering appropriate data into all text boxes on the form, the potential member has the option of submitting the form for processing by the Club, 452; of clearing all data from the text entry boxes, 450; or of canceling the process of filling out the application form, 454.

If the potential Consumer Member chooses to cancel the application process, 454, the data stored in the temporary form are deleted, 475, and the potential member's browser is immediately presented with the non-member home page, 230.

If the potential Consumer Member chooses to clear the application form of all data entered to the point where the Clear Form button is pressed, 450, all data with the exception of the potential Consumer Member's previously successful ZIP code, 210, are deleted from the text boxes in the form and the potential Consumer Member is presented with an otherwise blank form, 430.

In response to the potential Consumer Member's choice to submit the form to the Club for processing, 452, the system first checks to ensure that all text boxes contain appropriate data, 460, according to heuristics consistent with the expected nature of the data. If any data is missing, or inappropriate according to the heuristics, the Club redisplays the form with suggestions as to where the problems were encountered. That is, the system transits from 460 to 430.

If the Club determines that the data is adequate within the limitations of its heuristic processor, the Club creates a record in its permanent data persistence store and adds to the permanent record just created the data transmitted by the form, 465. A New Consumer Member report is filed, 470, to record a Consumer Member subscription event. The Club then constructs a Web page containing a single button labeled 'Login' and a message thanking the new Consumer Member for subscribing and welcoming him or her to the Club, and invites him or her to log into the system by clicking his or her mouse cursor on the Login button, 475.

If the new Consumer Member chooses to press the Login button on the 'Thank You and Welcome' screen, he or she is returned to the Club gateway, where he or she can immediately log in as a Consumer Member using the Username and Password he or she has just registered.

The new Consumer Member can at any time navigate Web pages previously downloaded to his or her computer by pressing the 'Back' button on his or her local browser window. The new Consumer Member can also navigate away from the site by other methods available to him or her via his or her browser. The only recourse available to the new member to continue to navigate the Club under direct control of the Club is to press the Login button. The next time the new member accesses the Club gateway, he or she will be able to log in using his or her chosen User Name and Password as a regular Consumer Member.

Turning next to FIG. 6, when a potential member chooses to apply as a Buyer Member, 270, the system creates a temporary data persistence object by virtue of constructing a Web browser form, 620, and transmitting it over the World Wide Web to the potential member's Web browser for presentation to the potential member, 630. The potential Buyer Member must enter appropriate data in all text entry boxes within the form, 632 through 654, as instructed by labels beside each text entry box on the form present by the browser.

Unlike the Consumer Member application algorithm there is no provision for entry of a User Name and Password. The Buyer Member application is intended to screen potential Club Buyers who, if their application passes automatic initial screening by the Club, must successfully complete an in-person interview with a representative of the Club, and subsequently sign a business agreement, before becoming a Club Buyer Member. The new Buyer Member chooses a User Name and Password once the agreement has been signed, and a Buyer Home page is then constructed by Club technical staff and assigned to the Buyer Member's chosen User Name and Password. The assigned Buyer Home page is then accessible from the gateway, 90, by entering the User Name and Password previously selected by the Buyer Member.

After entering appropriate data into all text boxes on the form, the potential Buyer Member has the option of submitting the form for processing by the Club, 662; of clearing all data from the text entry boxes, 660; or of canceling the process of filling out the application form, 664.

If the potential Buyer Member chooses to cancel the application process, 664, and the operation is confirmed, 666, the data stored in the temporary form are deleted, 668, and the potential member's browser is immediately presented with the non-member home page, 230.

If the potential Buyer Member chooses to clear the application form of all data entered to the point where the Clear Form button is pressed, 660, all data with the exception of the potential Buyer Member's previously successful ZIP code, 210, are deleted from the text boxes in the form and the potential Consumer Member is presented with an otherwise blank form, 630.

In response to the potential Buyer Member's choice to submit the form to the Club for processing, 662, the Club first checks to ensure that all text boxes contain appropriate data, 670, according to heuristics consistent with the expected nature of the data. If any data is missing, or inappropriate according to the heuristics, the Club redisplays the form with suggestions as to where the problems were encountered. That is, the system transits from 670 to 630.

If the Club determines that the data are adequate within the limitations of its heuristic processor, the Club creates a record in its permanent data persistence store and adds to the permanent record the data transmitted by the form, 675. A New Buyer Member report is filed, 680, to record a Buyer Member application event. The Club then constructs a Web page that contains a single button labeled "Home" and a message thanking the potential Buyer Member for applying and advising him or her that he or she will be contacted for an interview, 685.

If the potential Buyer Member chooses to press the Home button on the 'Thank You' screen, he or she is returned to the non-members home page.

The potential Buyer Member can at any time navigate Web pages previously downloaded to his or her computer by pressing the 'Back' button on his or her local browser window. The new Buyer Member can also navigate away from the site by other methods available to him or her via his or her browser. The only recourse available to the potential Buyer Member to continue to navigate the Club under direct control of the Club is to press the Home button. Until the potential Buyer Member has successfully completed the rest of the application process, which takes place offline and in person with a representative of the Club, and has had his or her chosen User Name and Password manually associated with a Buyer Member homepage, he or she will be unable to log in to the Club as a Buyer Member.

Turning next to FIG. 7, when a potential member chooses to apply as a Retailer Member, 280, the Club creates a temporary data persistence object by virtue of constructing a Web browser form, 720, and transmitting the form over the World Wide Web to the potential Retailer Member's Web browser for presentation to the potential Retailer Member, 730. The potential Retailer Member must enter appropriate data in all text entry boxes within the form, 732 through 754, as instructed by labels beside each text entry box on the form present by the browser.

Unlike the Consumer Member application algorithm, but similar to the Buyer Member application algorithm, there is no provision for entry of a User Name and Password. The Retailer Member application is intended to screen potential Retailer Members who, if their application passes initial screening, must successfully complete a face-to-face interview with a representative of the Club, and subsequently sign a business agreement, before becoming a Retailer Member. The new Retailer Member chooses a User Name and Password once the agreement has been signed, and a Retailer Home page is then constructed by Club technical staff and assigned to the Retailer. Member's chosen User Name and Password. The assigned Retailer Home page is then accessible from the gateway, 90, by entering the selected User Name and Password.

After entering appropriate data into all text boxes on the form, the potential Retailer Member has the option of submitting the form for processing by the Club, 762; of clearing all data from the text entry boxes, 760; or of canceling the process of filling out the application form, 764.

If the potential Retailer Member chooses to cancel the application process, 764, and the operation is confirmed, 766, the data stored in the temporary form are deleted, 768, and the potential Retailer Member's browser is immediately presented with the non-member home page, 230.

If the potential Retailer Member chooses to clear the application form of all data entered to the point where the Clear Form button is pressed, 760, all data with the exception of the potential Buyer Member's previously successful ZIP code, 210, are deleted from the text boxes in the form and the potential Retailer Member is presented with an otherwise blank form, 730.

In response to the potential Retailer Member's choice to submit the form to the Club for processing, 762, the system first checks to ensure that all text boxes contain appropriate data, 770, according to heuristics consistent with the expected nature of the data. If any data is missing, or inappropriate according to the heuristics, the Club redisplays the form with suggestions as to where the problems were encountered. That is, the system transits from 770 to 730.

If the Club determines that the data is adequate within the limitations of its heuristic processor, the Club creates a record in its permanent data persistence store and adds to the permanent record the data transmitted by the form, 775. A New Retailer Member report is filed, 780, to record a Buyer Member application event. The Club then constructs a Web page that contains a single button labeled "Home" and a message thanking the potential Retailer Member for applying and advising him or her that he or she will be contacted for an interview, 785.

If the potential Retailer Member chooses to press the Home button on the 'Thank You' screen, he or she is returned to the non-members home page.

The potential Retailer Member can at any time navigate Web pages previously downloaded to his or her computer by pressing the 'Back' button on his or her local browser window. The new Retailer Member can also navigate away from the site by other methods available to him or her via his or her browser. The only recourse available to the potential Retailer Member to continue to navigate the Club under direct control of the Club is to press the Home button. Until the potential Retailer Member has successfully completed the rest of the application process, which takes place offline and in person with a representative of the Club, and has had his or her chosen User Name and Password manually associated with a Retailer Member homepage, he or she will be unable to log in to the Club as a Retailer Member.

The final type of membership available in the Club is Proxy Membership. Proxy Members of the Club are members who have the right to purchase goods and services on behalf of an existing Consumer Member. The Proxy Member has no means of purchasing goods and services on behalf of him- or herself. The role of Proxy Member is intended for call center personnel taking phone orders from existing Consumer Members who are unable or unwilling to use a computer to access the Club via the World Wide Web.

Proxy Members may subscribe only through the Club administrator, 290. Item 290 represents an interface to the Club available only to the Club administrator, allowing him or her to directly modify the Member profile data persistence store on behalf of the Proxy Member applicant, in order to grant the Proxy Member applicant access to the Proxy Member part of the Club via 1557. The Club does not otherwise provide any other means for creating Proxy Memberships.

There is no mechanism for preventing the same person from subscribing for multiple memberships using different User Names in each instance. In the preferred embodiment there is no limit to the number of membership subscriptions a person may undertake, although it should be understood that a limiting heuristic is accounted for in the preferred embodiment of the present invention.

It should be noted that in the preferred embodiment of the present invention, the membership forms completed by potential Club Members offer the advantage of a method whereby potential Members are automatically screened, in addition to discrimination on the basis of ZIP code. Applicants can be automatically accepted or rejected on the basis of their response to selected questions on the forms by means of a software program, rather than requiring human review of all applications.

Existing Club Members identify themselves to the Club on the gateway, 90, by entering a pre-determined User Name and Password. The Club captures the User Name and Password to an object persistence store, verifies the Member's Username and Password, determines the type of membership (Consumer, Buyer, Retailer or Proxy) and presents a Home Page that inherits the characteristics of the membership type but that is personalized to the particular member.

To access the Club, a Club Member enters his or her Username and Password into the appropriate text boxes on the gateway and issues a Login Request by clicking a Login button, indicated in FIG. 1 as transiting between 90 and 122 via Login Request. The Club logs the Username and Password to permanent data persistence store, 122, and processes the request according to the Member Access Screening Algorithm.

Figure 15:
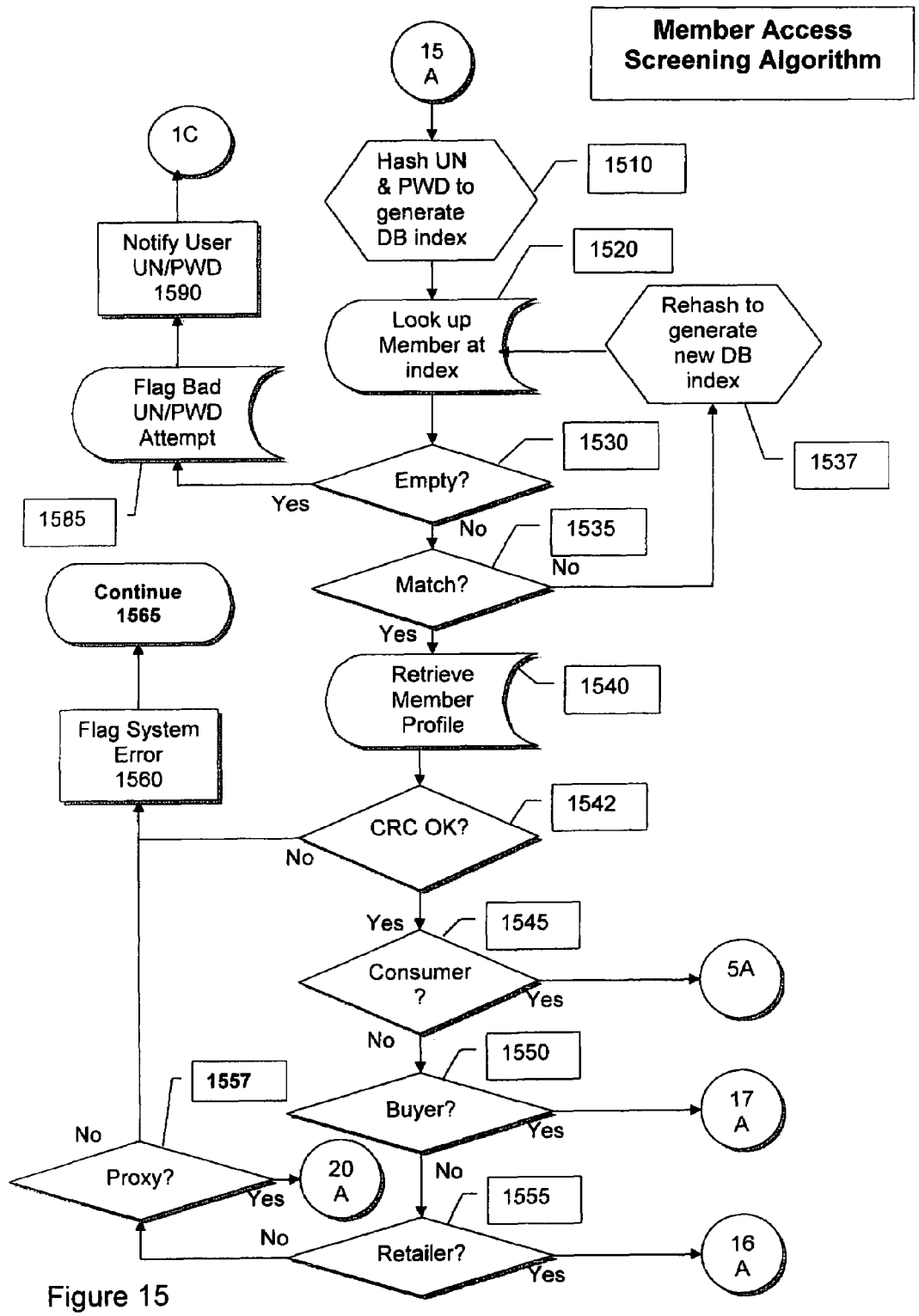
FIG. 15 is a flow chart illustrating the method implemented in the preferred embodiment of the present invention for screening Club Member User Names and Passwords.

FIG. 15 describes the Member Access Screening Algorithm. First, a location in the Club Member data persistence store is computed by a hashing algorithm that combines the Username and Password by a forward mapping technique based on prime numbers and random variables to produce a resulting integer that has a high probably of being unique, 1510. The Club Member data persistence store mapped as a hash table is queried using the result of the calculation as an index, 1520. The advantage of this approach is that search times are very fast compared to other search methods and are approximately equal for any search. If the index returns an empty record, the transition from 1530 to 1585 occurs, indicating that the Username/Password combination has not been registered with the Club. An error count associated with the Username and Password logged in 122 is incremented and the Club Member is advised that an error has occurred, 1590. He or she is returned to the gateway, 90. The Club Member can then repeat the login attempt.

It should be noted that the person attempting to gain access to the Club by entering a Username and Password might not be a Club Member, and might, in fact, be attempting to gain fraudulent access by attempting to guess a valid Username/Password combination associated with a bona fide Club Member, who may or may not be known to the person attempting to gain access to the Club Member's Club presence. The likelihood of this fraud being successful can be limited by the simple expedient of locking out further access after a certain number of failed attempts for a period of time, or permanently. However, this approach has the effect of further frustrating a bona fide Club Member who has simply forgotten his or her Username and/or Password. In this event the Club can be programmed to offer a possibly frustrated Club Member the option of having his or her Username and Password e-mailed to the e-mail address currently associated with his or her unique User Name, assuming the Club Member can provide his or her User Name. This option is excluded from the preferred embodiment in favor of the implementation of a challenge phrase, as follows. A Club Member who can provide his or her unique User Name is asked to associate the Password as a correct response to a word previously registered with the Club by the Club Member during subscription, which 'challenge word' might have been modified subsequently by the Club Member via a change in his or her Preferences.

In the preferred embodiment there is no limit to the number of attempts a Club Member can make to log in the Club, although it should be understood that the option of limiting this number is accounted for in the implementation of the present invention.

During the login process it might occur that the hash table lookup, 1520, produces a non-empty record, indicated by the transition from 1530 to 1535. In this event the Username and Password entered by the Club Member has hashed to an index that returns a valid Username and Password which are stored in the hash table together with keys to the Club Member profile associated with the stored Username and Password, but not necessarily the Username and Password entered by the Club Member. The possibility that the resulting data may not match the search data is inherent in all hashing algorithms. To determine whether the correct Club Member profile record has been found, the Username and Password that were entered by the Club Member in his or her attempt to access the Club are compared with the results of the search, 1535. If a complete match is found, the Club performs the transition, 1535 to 1540, retrieving the Club Member's profile from permanent data persistence store. If not, a new index is obtained by rehashing, 1537, and the table lookup is repeated, 1520. The type of membership associated with the profile determines which Club Member template will be loaded according to the Club Member's stored profile to produce the Club Member's personalized presence. The transition, 1545 to 510 is performed when the profile associated with the entered Username and Password combination is determined by its type to correspond to a Consumer Member. The transition, 1550 to 1710 is performed when the profile is determined to correspond to a Buyer Member. The transition, 1555 to 1570 is performed when the profile is determined to correspond to a Retailer Member. The transition, 1557 to the Proxy Member's presence, 2010, is performed when the profile is determined to correspond to a Proxy Member.

It might happen that while the result of the search provides a match to the Username and Password key data, the part of the profile that is interpreted as the Club Member's type does not compare with the fixed codes for Consumer, Buyer or Retailer Member types. This circumstance is a sufficient, but not necessary, indication of failure in the integrity of the data persistence store and is flagged as a Club error in the transition 1557 to 1560. There are safeguards against corruption and error-detection and correction methods built into the third-party data persistence engine, and into the media upon which the persistence store resides. However, The Club stores a four-byte cyclic redundancy check-word (CRC) as part of the Club Member's profile as an extra test of persistence store integrity, which test is easily and routinely performed by the Club during access of the store. This is indicated explicitly by 1542 and implied whenever the store is accessed in the preferred embodiment.

A failure in the integrity of the data persistence store is flagged as a system error, 1560, and can be immediately reported to the Club administrator, a human, via a variety of means. The means in the preferred embodiment include e-mail and a prominent warning appearing in the Club Administrator's presence, manifested as an alarm on an administrative Web page, which is presumably monitored by the Club administrator at regular intervals. The Club will attempt to continue to function in general in the presence of errors, as illustrated specifically by 1565, where in the event that any damage to the data persistence store has been confined to a limited number of records in an segment of the store. In this instance, Club members whose profiles are associated with affected sections of the data store will be unable to access the Club until the issue has been resolved, but other Club Members might. As a precaution against significant loss of Member data the Club provides for backup of Member data at regular intervals within the preferred embodiment of the present invention.

Once a Club Member's User Name and Password have been verified, the Club constructs a personalized presence using a template appropriate to the Club Member's type of membership and the Club Member's profile. The Club recognizes four types of Club Member; namely, Consumer Member, Buyer Member, Retailer Member and Proxy Member.

Figure 5:
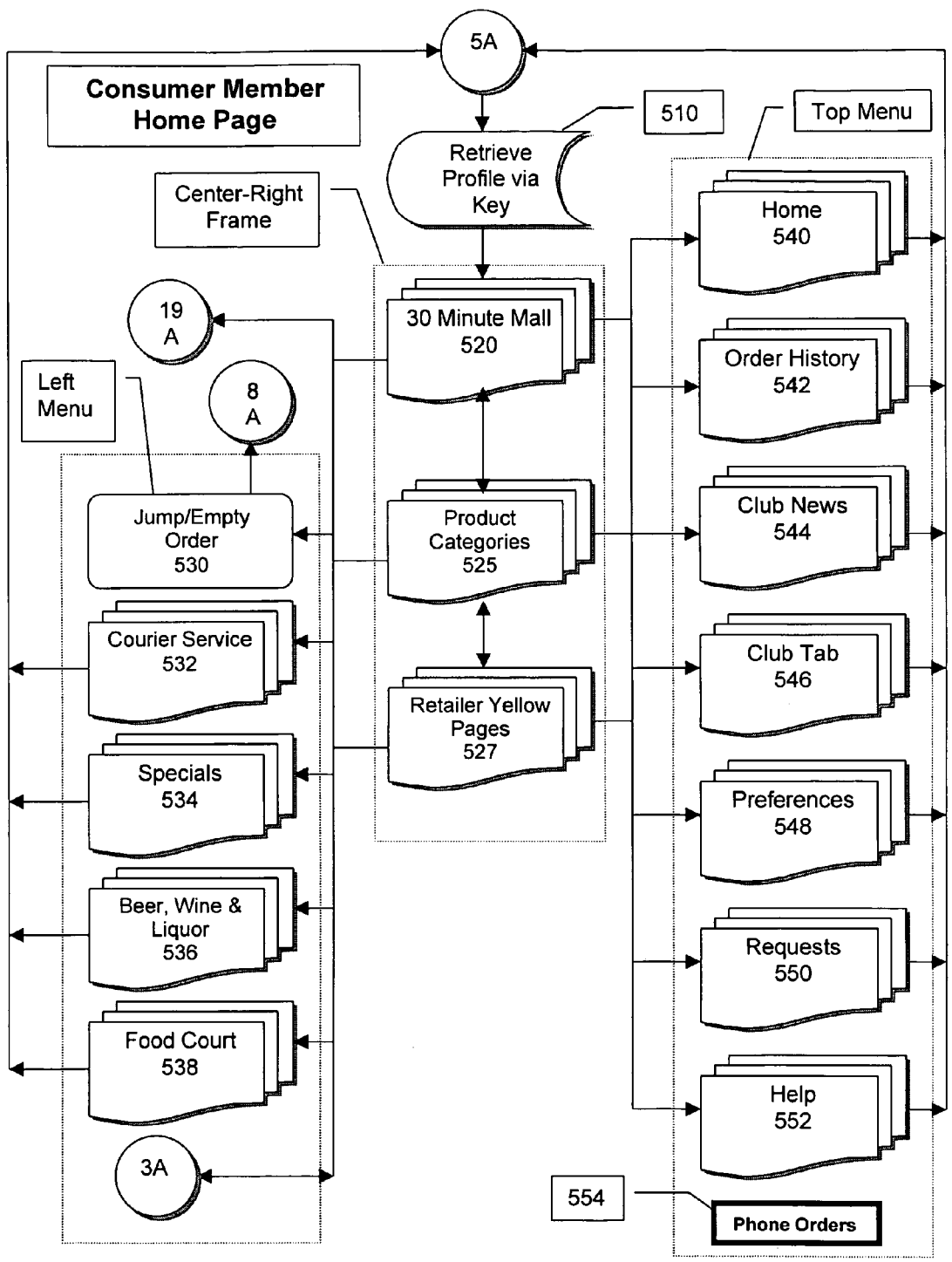
FIG. 5 is a flow chart illustrating the Consumer Member Home Page features of the Club described in the preferred embodiment of the present invention.

The template presence for a Consumer Member is illustrated in FIG. 5. The Consumer Member experiences his or her presence as a frames-based Web page. Upon determining that the login data match a Consumer Member pattern, the Club executes 1545 and transits to 510, where the particular Consumer Member's profile is retrieved. The Club constructs and downloads to the Consumer Member's browser the Consumer Member's Home page, which comprises three (3) frames; namely, the Center-Right Frame, the Left Menu frame and the Top Menu frame, as indicated in FIG. 5. The Left Menu frame further comprises elements 530 through 538. The Center-Right Frame further initially comprises element 520. The Top Menu frame further comprises elements 540 through 554. The purpose and function of these elements are explained later. According to the art, optional paths 530 through 538 that comprise the left-side frame, and optional paths 540 through 552, with the exception of element 554, that comprise the top frame, are referred to as menus.

554 represents a phone number, and a caption explaining the purpose and use of the phone number, which is available to Consumer Members for purpose of placing Buying Orders by telephone, via a Proxy Member. 554 is implemented as fixed text within the Top Menu frame, to act as a reminder to Consumer Members. In the preferred embodiment of the present invention, the caption associated with the telephone number explains that there is an additional fee associated with the placement of Buying Orders by telephone via a Proxy Member. The telephone service is an advantage of the preferred embodiment of the present invention, in that it is intended to provide a convenience for Consumer Members who might find themselves from time-to-time wishing to place a Buying Order, but unable to access a computer terminal connected to the World Wide Web.

Figure 16:
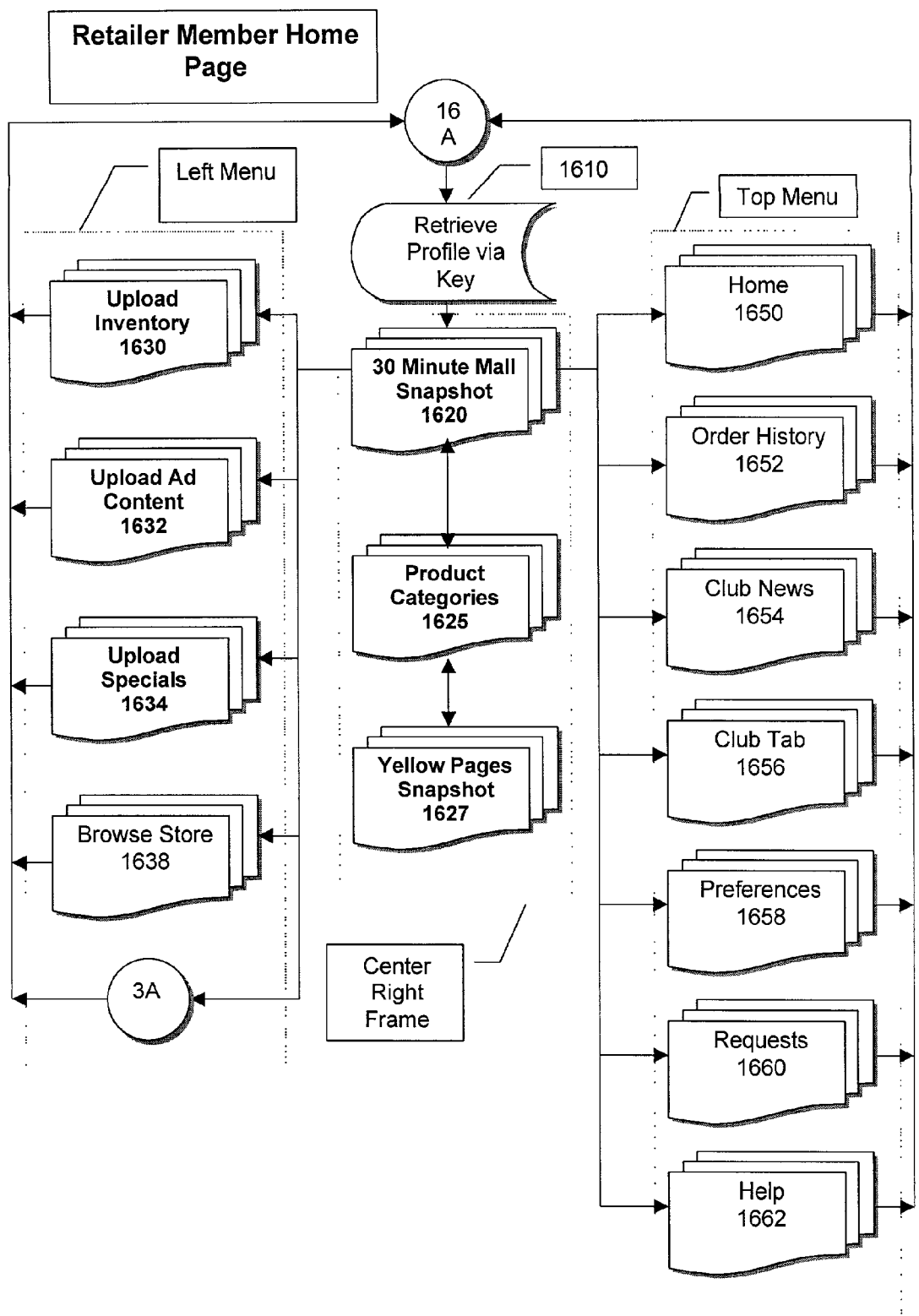
FIG. 16 is a flow chart illustrating navigation of the Retailer Home Page of the preferred embodiment of the present invention.

The template presence for a Retailer Member is illustrated in FIG. 16. Like the Consumer Member, the Retailer Member experiences his or her presence as a frames-based Web page. Upon determining that the login data match a Retailer Member pattern, the Club executes 1555-YES and transits to 1610, where the particular Retailer Member's profile is retrieved. The Club constructs and downloads to the Retailer Member's browser the Retailer Member's Home page, which comprises three (3) frames; namely, a left-side frame, elements 1630 through 1638, a center-right frame initially comprising element 1620 and a top-frame comprising elements 1650 through 1662. The purpose and function of these elements are explained later. According to the art, optional paths 1630 through 1638 that comprise the left-side frame, and optional paths 1650 through 1662 that comprise the top frame, are referred to as menus.

Figure 17:
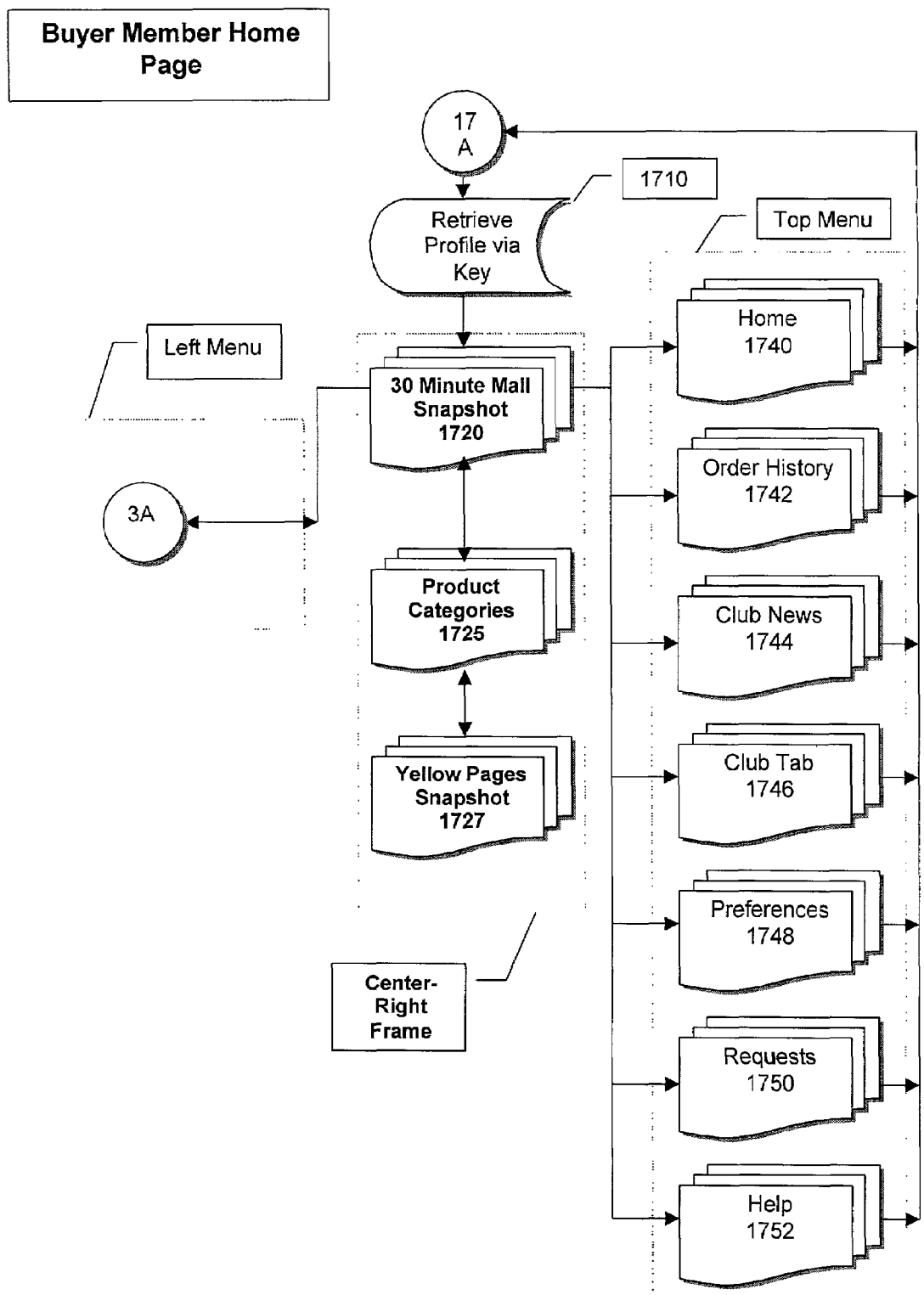
FIG. 17 is a flow chart illustrating navigation of the Buyer Home Page of the preferred embodiment of the present invention.

The template presence for a Buyer Member is illustrated in FIG. 17. Similar to the Consumer and Retailer Members, the Retailer Member experiences his or her presence as a frames-based Web page. Upon determining that the login data match a Buyer Member pattern, the Club executes 1550-YES and transits to 1710, where the particular Buyer Member's profile is retrieved. The Club then constructs and downloads to the Buyer Member's browser the Buyer Member's Home page, which comprises three (3) frames; namely, a left-side frame, comprising elements 310 through 380, a center-right frame initially comprising element 1720 and a top-frame comprising elements 1740 through 1752. The purpose and function of these elements are explained later. According to the art, optional paths 310 through 380 that comprise the left-side frame, and optional paths 1740 through 1752 that comprise the top frame, are referred to as menus. It should be noted that the Buyer Member's Left Menu is limited to the Company Information Sidebar, rather than offering interactivity with Club content in the manner available to the Consumer, Retailer and Proxy Members.

Figure 20:
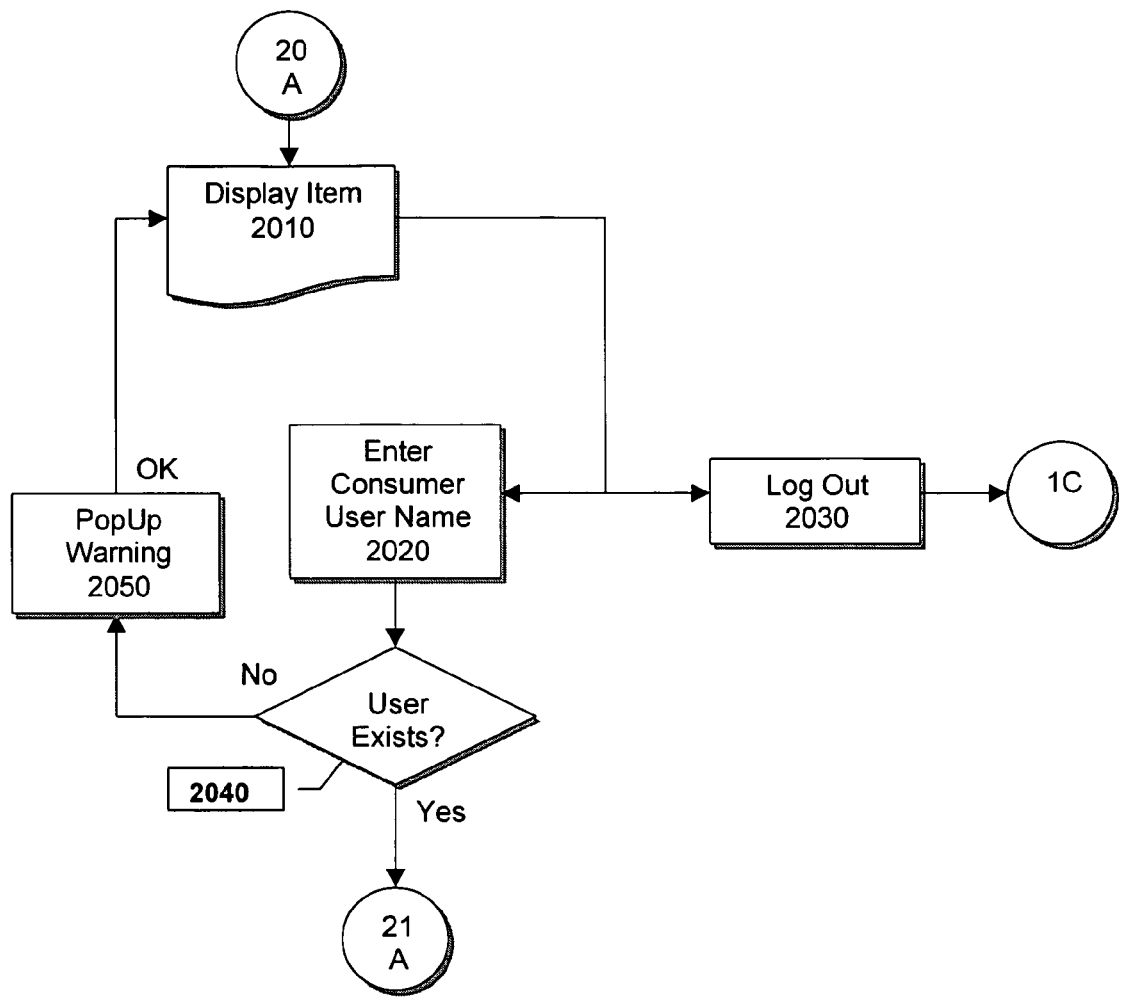
FIG. 20 is a flow chart illustrating the algorithm for granting Proxy Member's access to a Consumer Member's account in the preferred embodiment of the present invention.

The template presence for a Proxy Member is illustrated in FIG. 20. The Proxy Member experiences his or her presence as a frames-based Web page. Upon determining that the login data match a Proxy Member pattern, the Club executes 1557-YES and transits to 2010. The Proxy Member is not assigned a profile, unlike the previously described Members. Instead, the Proxy Member inherits the profile of the Consumer Member on whose behalf the Proxy Member is accessing the Club. Accordingly, the options available to the Proxy Member are initially limited to supplying the User Name of the Consumer Member on whose behalf the Proxy Member is acting, 2020, or logging out of the Club, 2030. If the Proxy Member chooses to log out of the system by executing option 2030, the Club terminates the Proxy Member's browser's ability to revisit 2010 by means familiar to practitioners of the art, and returns the Proxy Member to the gateway login page, 90. If the Proxy Member chooses to enter the User Name of a Consumer Member on whose behalf he or she is acting, 2020, the Club attempts to verify that the User Name supplied by the Proxy Member is valid, 2040. If the Club determines that the User Name supplied by the Proxy Member does not match any Consumer User Name in Consumer Member data persistence store, 2040-No, the Club downloads a small, secondary Web page, or Pop-Up Window, to the Proxy Member's browser that indicates this circumstance. The Club invites the Proxy member to acknowledge that the supplied User Name is invalid by providing a button labeled "OK" in the Pop-Up Window. The Proxy Member is expected to acknowledge the error by maneuvering his or her mouse cursor over this button and click upon it, in the manner familiar to the art, thus executing 2050-OK and being returned to 2010. In the transition to 2010, the Pop Up Window is collapsed. If the Club determines that the User Name supplied by the Proxy Member matches that of a Consumer Member, 2040-Yes, the Club transits to 2110, where the profile corresponding to the supplied Consumer Member User Name is retrieved. The Club then constructs and downloads to the Proxy Member's browser a proxy version of the Consumer Member's Home page, which comprises three (3) frames; namely, a left-side frame, comprising elements 2140 through 2148, a center-right frame initially comprising element 2120 and a top-frame comprising elements 2160 and 2170. The purpose and function of these elements are explained later. As before, optional paths 2140 through 2148 that comprise the left-side frame, and optional paths 2160 and 2170 that comprise the top frame, are referred to as menus. It should be noted that the Proxy Member's Top Menu is limited for the purpose of denying the Proxy Member access to the Consumer Member's personal and confidential information, and to disallow alteration of the Consumer Member's Preferences.

In terms of functional clustering, elements associated with the primary purpose of the Member presence, which in the case of the Consumer Member is purchasing, are clustered together in the left-side and center-right frames. The center-right frame represents the physical instantiation of the principle concept of the Club, namely a virtual shopping mall, and occupies the greatest area within the Club Member's browser window. Retailers within the virtual mall are represented by active demarcated areas of a grid, each active area demarcated by buttons labeled with the retailer name, in the case of retailers local to the Member Area who are not Retailer Members of the Club, or more visibly by icons incorporating the retailer's logo, in the case of Retailer Members. All retailers represented on the grid have a place of business within the Member Area.

Operation of the Member Home page part of the Club, thus arrived at in consideration of the foregoing, will now be disclosed, first by specifying that of the Consumer Member. With reference to FIG. 5, if a Consumer member chooses to click his or her mouse cursor on a demarcated representation of a retailer within the said grid, 520, the Club determines which retailer the Consumer Member intends via the coordinates of the selected demarcated area relative to the grid. According to the art, the grid functions as an image map.

Figure 18:
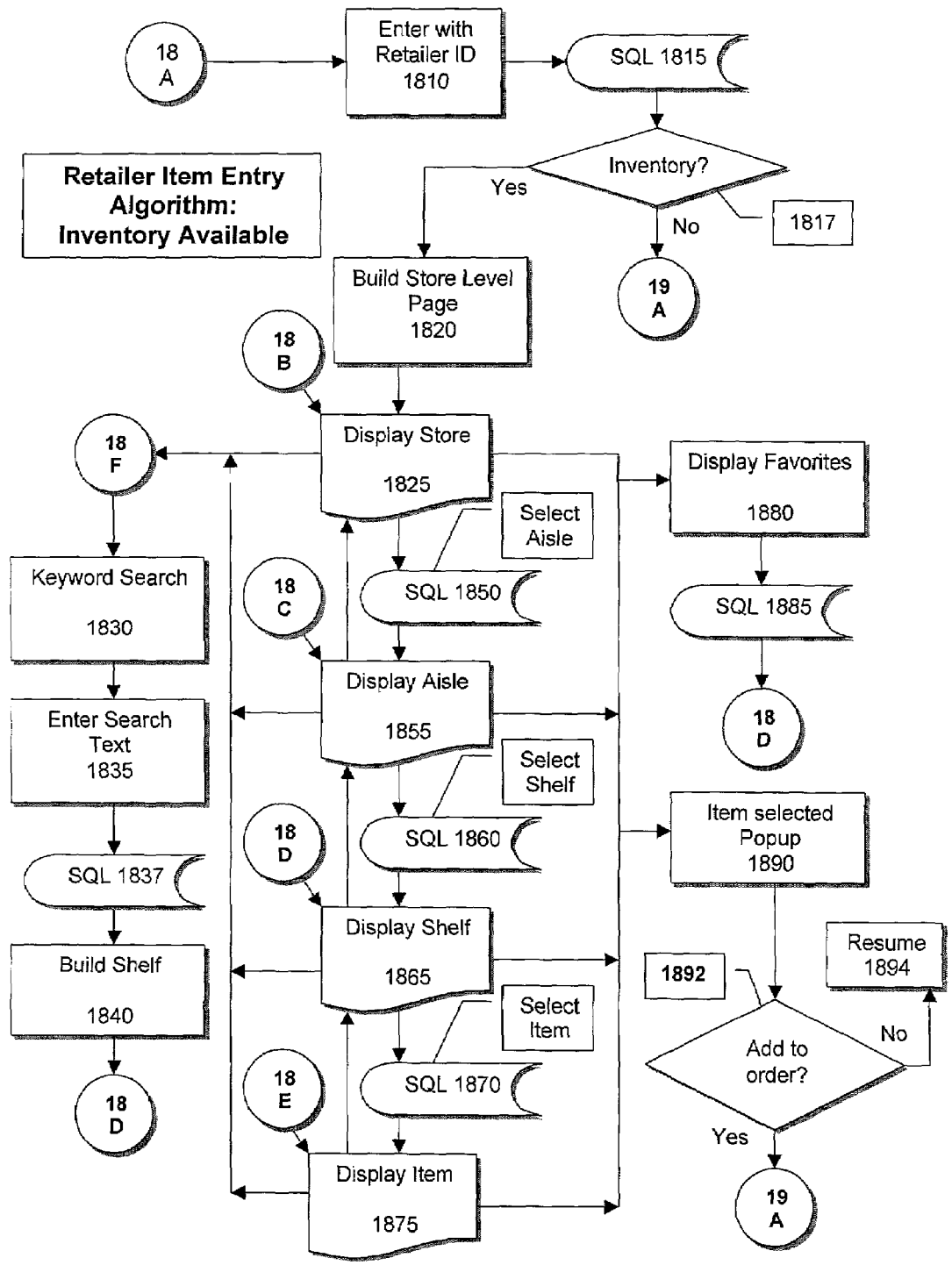
FIG. 18 is a flow chart illustrating navigation of an inventoried retailer member's offering in the preferred embodiment of the present invention.

As shown by way of example in FIG. 18, the Club retrieves data from object persistence store by SQL queries of the Club's object persistence store, 1815 using a Retailer Identifier, 1810, which corresponds to a retailer selected by the Consumer Member. By this method the Club uses an index derived from the grid demarcation representing the retailer selected by the Consumer Member to retrieve the profile of the selected retailer, in order to determine whether the Club's object persistence store associates a product inventory with the selected retailer. The inventory associated with a given retailer is referred to as the Registered Inventory. A Registered Inventory is a product database containing sufficient information about all products claimed to be for sale by the selected retailer to enable the Consumer Member to make a purchasing decision in regard to an specific product for sale. If the Club determines that there is a Registered Inventory associated with the selected retailer, 1817, the Club transits to 1820, and constructs a Retail Outlet Browsing Web page using Retail Outlet Browsing Web page template. The Web page is constructed from the template by linking product pointers within the template to the selected retailer's Registered Inventory, and personalization placeholders to objects in the profiles of the selected retailer and the Consumer Member.

The object of shopping, in the preferred embodiment of the present invention, is to locate and purchase a product. The process of locating a product is a type of search, which in any undertaking can generally be conducted by successive narrowing of scope. Within the art of Web applications a search is often performed by means of a textual search engine, some implementations of which permit sub-searches of previous search results for the purpose of narrowing scope. Other textual search implementations rely entirely upon the analysis of a sequence of keywords associated by Boolean operators. While textual searches can be efficient for sophisticated users of the World Wide Web, textual searches entail a type of associative thinking that is not necessarily native to the conventional shopping experience. A retailer's product offering, as registered with the Club, is organized in the preferred embodiment of the present invention into virtual Aisles, Shelves and Items. This device implicitly implements a search refinement method with which Consumer Members are familiar as conventional shoppers, since it is directly analogous to real-world retail stores, where a store contains labeled Aisles that in turn comprise a number of Shelves. Aisles in conventional stores are labeled in such a way as to suggest the contents of the aisles in a perspective convenient to the shopper. The contents of the aisles themselves are generally at right angles to the field of view, and difficult to inspect unless the aisle is perambulated. Shelves within Aisles are, in general, organizational elements that comprise a number of items. Shelves specifically comprise items that can be ranked within a single category of product; for example, different kinds of canned soup; and products that differ qualitatively or quantitatively from each other; for example, by model, size or brand. An exception to the specific definition of Shelf as contained in the preferred embodiment of the present invention is outlined in subsequent paragraphs, in that a Shelf tailored to the Consumer Member is provided as well, which comprises products regularly purchased from the selected retailer by the Consumer Member.

The organization of the selected retailer's inventory in mimicry of the real-world shopping experience is an advantage of the preferred embodiment of the present invention, in that it affords familiarity to the virtual, or on-line, shopping experience, lessening any disorientation to which Web-naive Consumer Members might be prone. The successive refinement of the search from Aisle View, through Shelf View to Item view is intended to mimic the experience of perambulating a physical store. For more Web-sophisticated Consumer Members, a textual search of the Registered Inventory data persistence store is additionally provided in the preferred embodiment of the present invention, 1830 through 1840, by means of which the Club constructs a Shelf comprising results of the search. In this case the Consumer Member determines the commonality among the items appearing on the Shelf thus constructed. The search at the selected Retailer level can be undertaken within the context of product category, and refined by product characteristics, including manufacturer, model, size, color, etc. The textual search feature is an advantage of the preferred embodiment of the present invention, because it allows a Consumer Member unfamiliar with the arrangement of the selected retailer's product offering to quickly determine whether the retailer sells a specific product, and if so, to locate it. In the preferred embodiment, the location process is essentially one of having the Club retrieved the sought product(s) to a Shelf immediately accessible to the Consumer Member.

The Retail Outlet Browsing Web page is personalized by the collection onto a single Shelf of any regularly purchased products, or Favorites, the Consumer Member might have among the products offered by the selected retailer. The Favorites Shelf specific to the selected retailer is a subset of a broader list of regularly purchased products determined by automatic, heuristic analysis of patterns that might exist in the Consumer Member's purchase history across all retailers known to the Club. The list of favorites is kept as part of the Consumer Member's profile in data persistence store. The Favorites Shelf is an advantage of the preferred embodiment of the present invention, in that it facilitates the task of shopping for regularly purchased items, since the Consumer Member doesn't have to navigate the Club to locate them. The Consumer Member can view the contents of his or her Favorites Shelf while presented with the Retail Outlet Browsing Web page by moving his or her mouse cursor over a button on the said Web page and depressing, or 'clicking', the left mouse button. This action causes the Club to transit 1880, 1885 and 1865, which results in the construction and presentation of a frame representative of the items on the Consumer Members Favorites Shelf.

In addition to thus personalizing the Retail Outlet Browsing Web page to the Consumer Member by means of a Favorites Shelf, in the case where the selected retailer is a Retailer Member of the Club, the Retail Outlet Browsing Web page is further personalized to the Retailer Member. In this case, the Retail Outlet Browsing Web page is personalized to the Retailer Member by the inclusion of objects provided to the Club by the Retailer Member, and related to the Retailer Member's profile in the Club's object persistence store. These objects comprise, but are not limited to, the Retailer Members' trademarks, logos and any current special offerings, including coupons, sponsored by the Retailer Member.

The Retail Outlet Browsing Web page for non-member retailers selected from the grid can be personalized, as above, to the Consumer Member, but is not necessarily personalized to the selected non-member retailer.

In FIG. 18, the path 1825, 1855 via 1850, 1865 via 1860 through 1875 via 1870 is intended to show how the Consumer Member can navigate the retailer's Registered Inventory by a process resembling perambulation. Navigation from 1825 to 1875 is the virtual equivalent of navigating the retailer's actual store to locate a specific product according to the following process: first, the Consumer Member is presented with the entire contents of the store, 1825, represented as a collection of Aisles. In the preferred embodiment of the present invention, the presentation of the Aisles as any one of an arrangement of icons, a grid of hypertext links, a pull-down list or visual demarcations on an image map are equivalent. The sole purpose of differentiating the Registered Inventory by images or by text into related categories is to allow the Consumer Member to subsection the Registered Inventory in order to refine the search for a particular product. If the Consumer Member selects a particular Aisle, which is to say, a collection of related product categories, by clicking the mouse cursor on the associated demarcation, icon or textual description, the Club transits 1825 via 1850 to 1855. The Consumer Member is then presented with a view of the selected Aisle as a collection of Shelves, which is to say a collection of related categories of product; for example, product categories associated with cooking, or automobile maintenance. The Shelves are represented equivalently in the preferred embodiment of the present invention as an arrangement of icons, a grid of hypertext links, a pull-down list or visual demarcations on an image map. If the Consumer Member selects a particular Shelf, the Consumer Member is presented with a view of the selected Shelf as a collection of Items, which is to say a collection of items that fall within a further reduced scope of definition. For example, the Aisle representing 'Photographic Equipment' might contain a Shelf containing cameras; a Aisle representing 'Canned Goods' might contain a Shelf containing soups. It's clear that the refinement process can be continued further, and the process of further refinement is accommodated in the preferred embodiment by permitting Sectioning of the Store, of each Aisle and of each Shelf. Thus a Shelf containing soups can be sectioned by brand, and each brand sectioned by type or ingredients. Actual items for sale, 1875, are not sectioned.

Any level within the hierarchical representation of Registered Inventory intended to contain collective objects may also contain singular objects. This means to say that while Store, 1825, is a collection of Aisles; and Aisle, 1855, is a collection of Shelves, both Store and Aisle can contain singular objects, or irreducible items. These items might be products available for purchase, or coupons intended to steer purchase decisions. These out-of-context singular objects correspond to products the retailer wishes to highlight, or Specials.

If a Consumer Member selects a coupon, by clicking on it, the Club treats the selection as a 'hot link' as it is referred to in the art, and causes the Consumer Member's browser to load a Web frame solely associated with the underlying product. The said frame contains advertising copy related to the underlying product, as well as descriptive material sufficient for the Consumer Member to make a buying decision about the underlying product.

The act of selecting any singular object, including Specials and Items on Shelves, causes the Club to download a pop-up query to the Consumer Member's browser, 1890, which pop-up query contains a text message inviting the Consumer Member to add the singular object to his or her buying order. The Consumer Member is free to accept or decline, 1892, the invitation. If the invitation is declined the pop-up is collapsed the Club allows the Consumer Member to resume from where he or she selected the singular object, 1894.

Figure 19:
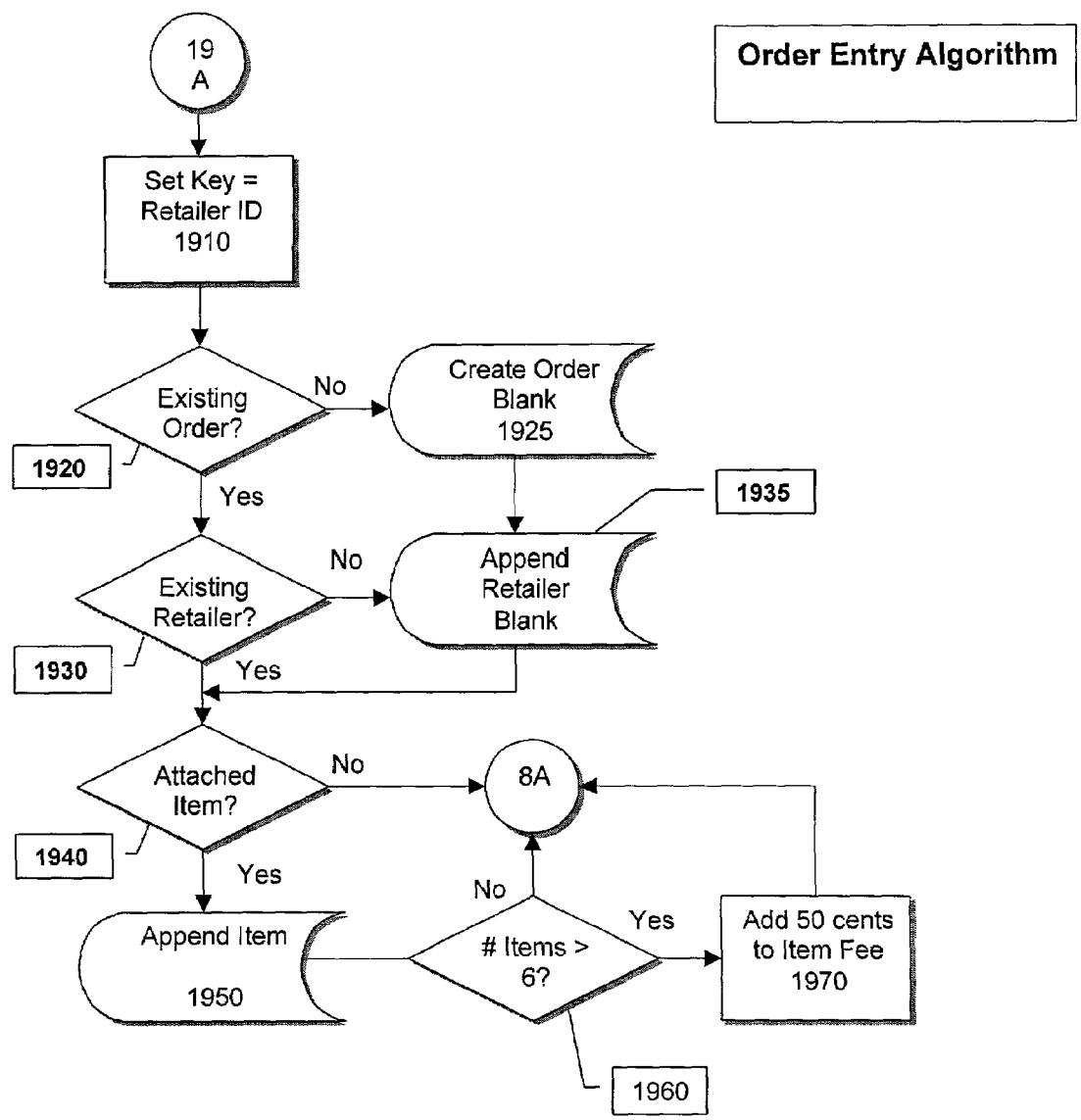
FIG. 19 is a flow chart illustrating initialization of the Buying Order form in the preferred embodiment of the present invention.

Next, in FIG. 19, in the event the Consumer Member chooses to accept the invitation to add the selected product to his or her Buying Order, the Club transits to 1910, where a key is set equal to an identification number associated with the current retailer. If there is no pre-existing Buyer Order, 1920, a blank Buying Order is created in temporary persistence store, 1925, and a blank entry for the retailer is appended to the Buying Order, 1935. If there is a pre-existing Buying Order, the pre-existing Buying Order is inspected to determine whether the current retailer already has a section delimited within the Buying Order, 1930. If the current retailer is not yet represented in the pre-existing Buying Order, a blank retailer entry is appended to the Buying Order, 1935.

In any event, if the Club evoked the Buying Order algorithm and passed an item to be entered into a new or pre-existing Buying Order, 1940, the item is appended to the Buying Order in the current retailer's section, 1950. According to Club policy, if the number of items being considered for purchase from a single retailer exceed six (6) on the Buying Order, a service fee of fifty cents ($0.50) is incurred by the Consumer Member for each item in excess of six (6), 1960 and 1970. Upon completion of the Buying Order entry, a Web frame representing the Buying Order is downloaded to the Consumer Member's browser for his or her inspection, 810.

Figure 8:
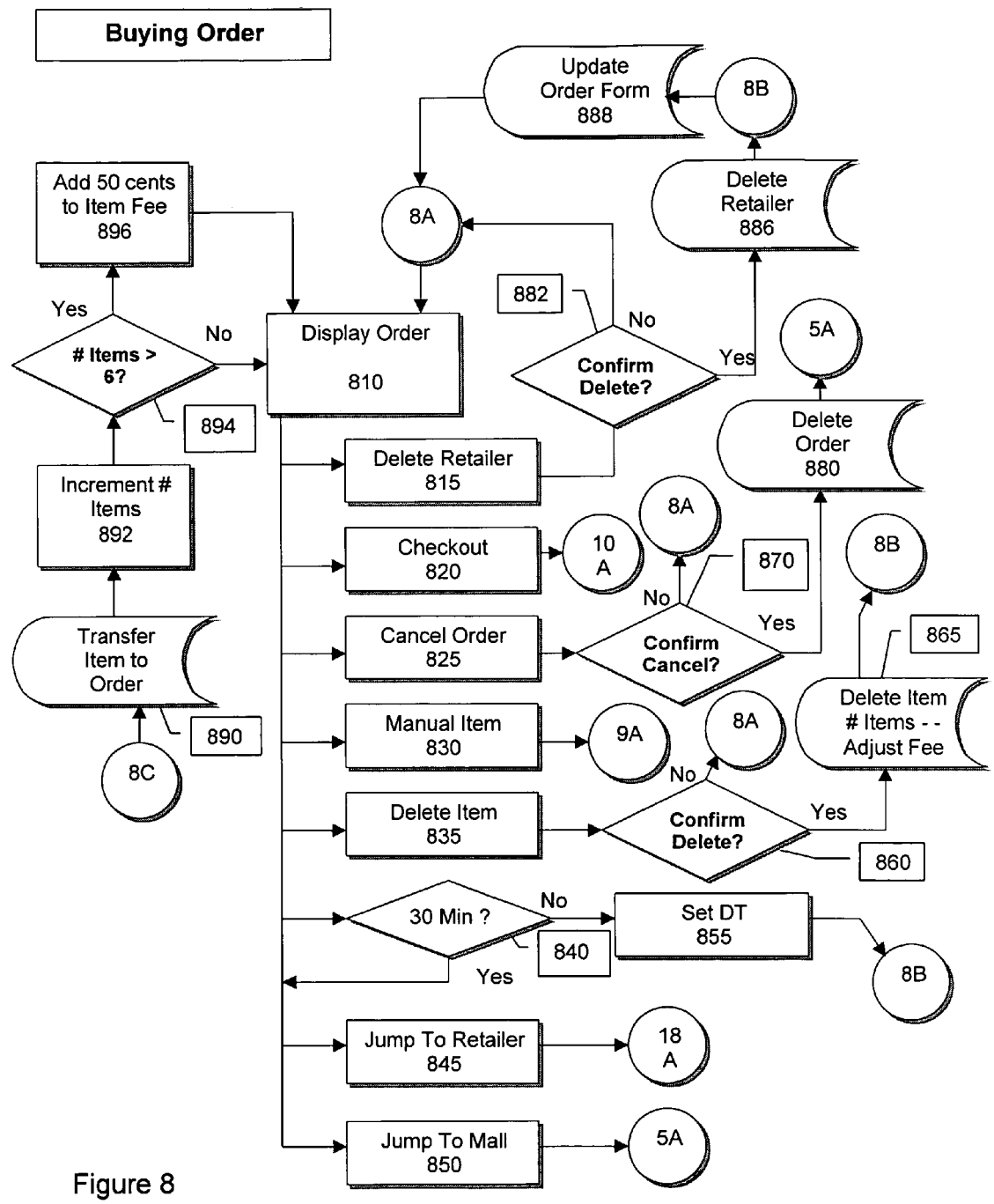
FIG. 8 is a flow chart illustrating the Order Entry features of the Club described in the preferred embodiment of the present invention.

FIG. 8 next illustrates the Buying Order interaction algorithm. When the Buying Order has been presented to the Consumer Member, 810, he or she has the option of executing any of the functions 815 through 850. The Consumer Member can delete any item, 835, from the Buying Order; delete any retailer and all items associated with that retailer, 815; or cancel the entire order, 825. If the Consumer Member chooses to delete an item, 835, the Club confirms the Consumer Member's intention, 860. If the Consumer Member confirms his or intention to remove the item from the Buying Order, 860, the Club deletes the item, 865, updates the Buying Order, 888, including recalculating all dollar amounts comprising fees, tariffs, taxes associated with the deleted item, and re-displays the Buying Order, 810. If the Consumer Member decides against the choice to delete the item, 860, the Club re-displays the Buying Order, 810. If the Consumer Member chooses to delete a retailer from the Buying Order, and all items associated with the retailer, 815, the Club confirms the Consumer Member's intention, 882. If the Consumer Member confirms his or intention to remove the retailer from the Buying Order, 882, the Club deletes the retailer, 886, updates the Buying Order, 888, including recalculating all dollar amounts comprising fees, tariffs, taxes associated with the deleted retailer, and re-displays the Buying Order, 810. If the Consumer Member decides against the choice to delete the retailer, 882, the Club re-displays the Buying Order, 810. If the Consumer Member chooses to cancel the entire Buying Order, and all retailers and items associated with the retailer, 825, the Club confirms the Consumer Member's intention, 870. If the Consumer Member confirms his or intention to cancel the Buying Order, 870, the Club deletes Buyer Order, 880, and re-displays the Consumer Member's Home page, 510. If the Consumer Member decides against the choice to cancel the Buying Order, 870, the Club re-displays the Buying Order, 810.

Upon inspection of the Buying Order, the Consumer Member might decide that it is incomplete, in comparison with the list of products of which the Consumer Member has immediate need. Therefore the Consumer Member might wish to return to the retailer whose virtual presence he or she just visited, via 845. In the preferred embodiment of the present invention the Club further assumes that the list of products of which the Consumer Member has immediate need might contain items that cannot be provided by a single retailer. Hence the Club offers the ability to return to the virtual mall after inspecting the Buyer Order, via 850, to visit a different retailer from the one just visited. In this regard the shopping experience is tailored to the perspective of the Consumer Member, rather than to the expectations of a given retailer. The Club allows the Consumer Member to navigate from retailer to retailer within the 30-Minute Mall, selecting items available for purchase from each retailer and adding them to his or her Buying Order, without paying for the items upon exiting each retail presence. This approach taken by the preferred embodiment is advantageous in that the Consumer Member will find it more convenient to reconcile the cost of the aggregate Buying Order upon exiting the 30-Minute Mall, as opposed to reconciling his or her account with each individual retailer upon exiting an individual retail presence within the 30-Minute Mall. In the preferred embodiment of the present invention, provision of the ability for simultaneous fulfillment of products from more than one retailer on a single Buying Order is referred to as a "Combo Order."

Figure 9:
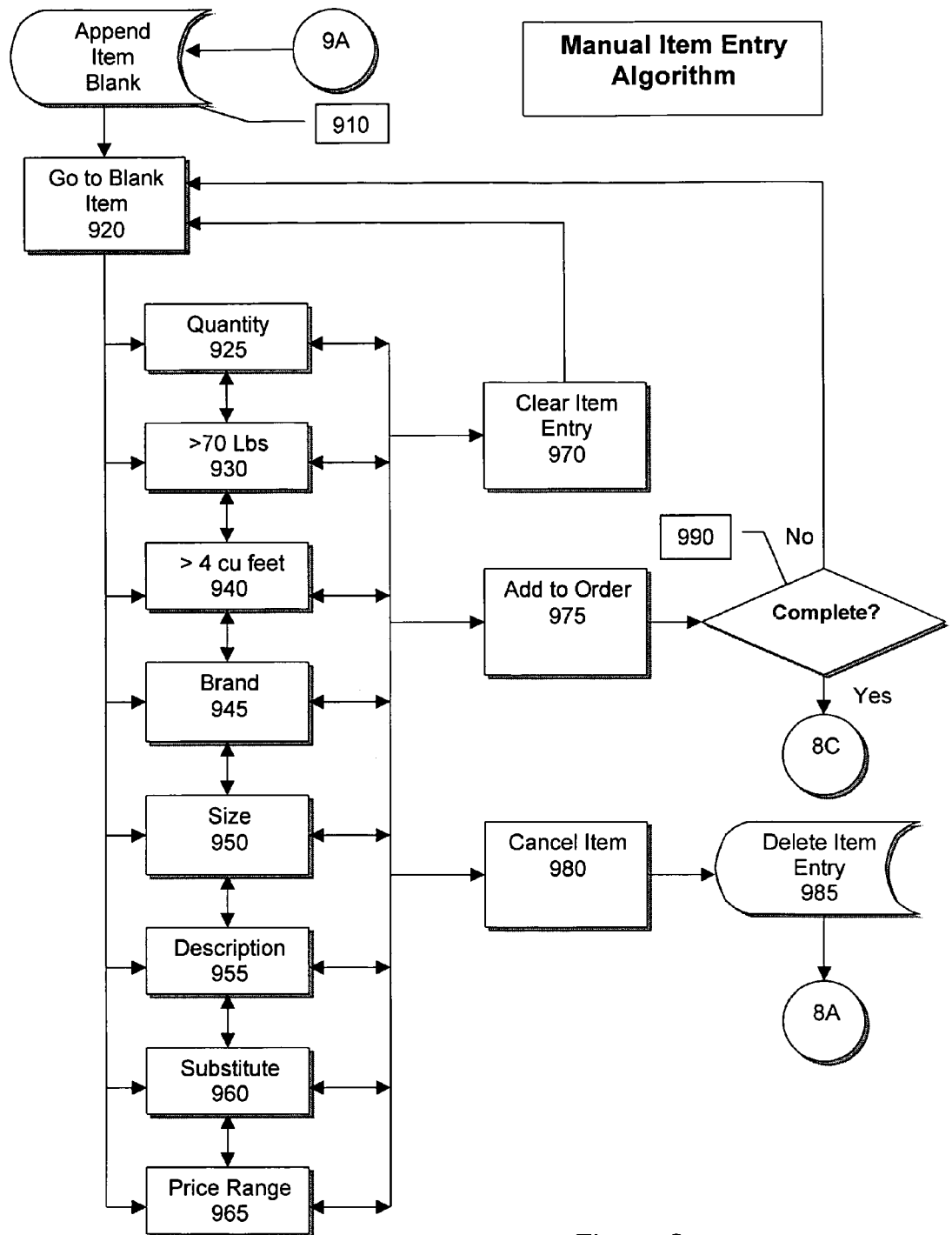
FIG. 9 is a flow chart illustrating the Item Entry features of the Club described in the preferred embodiment of the present invention.

By virtue of the fact that the 30 Minute Club is based upon Member Areas, and therefore based upon retailers within the neighborhood of the Consumer Member, it may occur from time to time that the Consumer Member is aware of, and desirous of purchasing, products available from a local retailer that are not included in the Registered Inventory the Club associates with the retailer. This eventuality is provided for in the preferred embodiment of the present invention by the capability of manual entry of Off List products, so-called in the preferred embodiment. A Consumer Member can add to his or her Buying Order an item he or she knows to be for sale by a retailer available in the 30-Minute Club, but which item is not explicitly associated with the retailer's Registered Inventory by the Club, by means of 830. This path, illustrated in FIG. 9, allows for the appending of a blank item, 920, to the list of products associated with a specified retailer within the Buying Order, 910. The Consumer Member may then enter specific descriptive attributes of the product, as suggested by 925 through 965, into text fields in the item blank. The Consumer Member can then elect to add the item thus defined to the Buying Order, via 975, if the Club determines that the description of the item is adequate, 990. Returning to FIG. 8, if the Consumer Member chooses to add the manually defined item to the Buying Order, the Club executes the sequence of operations 890 through 896 to account for inclusion of the item among the products, if any, already attributed to the retailer within the Buying Order. Other options available to the Consumer Member during manual item definition, as illustrated in FIG. 9, include the ability to clear any information that the Consumer Member has entered into the item blank, 970, or to cancel manual item definition, 980 and 985, and return to the Buying Order.

Back to FIG. 8, at this time, or in fact at any prior time while viewing the Buying Order, the Consumer Member can specify an alternative to 30-minute delivery from time of dispatch of the order by means of 840, whereby the Consumer Member specifies a time of day for delivery at 855. This option is intended to delay delivery at the convenience of the Consumer Member, and cannot be used in the attempt to accelerate delivery inside of the 30-minute window.

Figure 10:
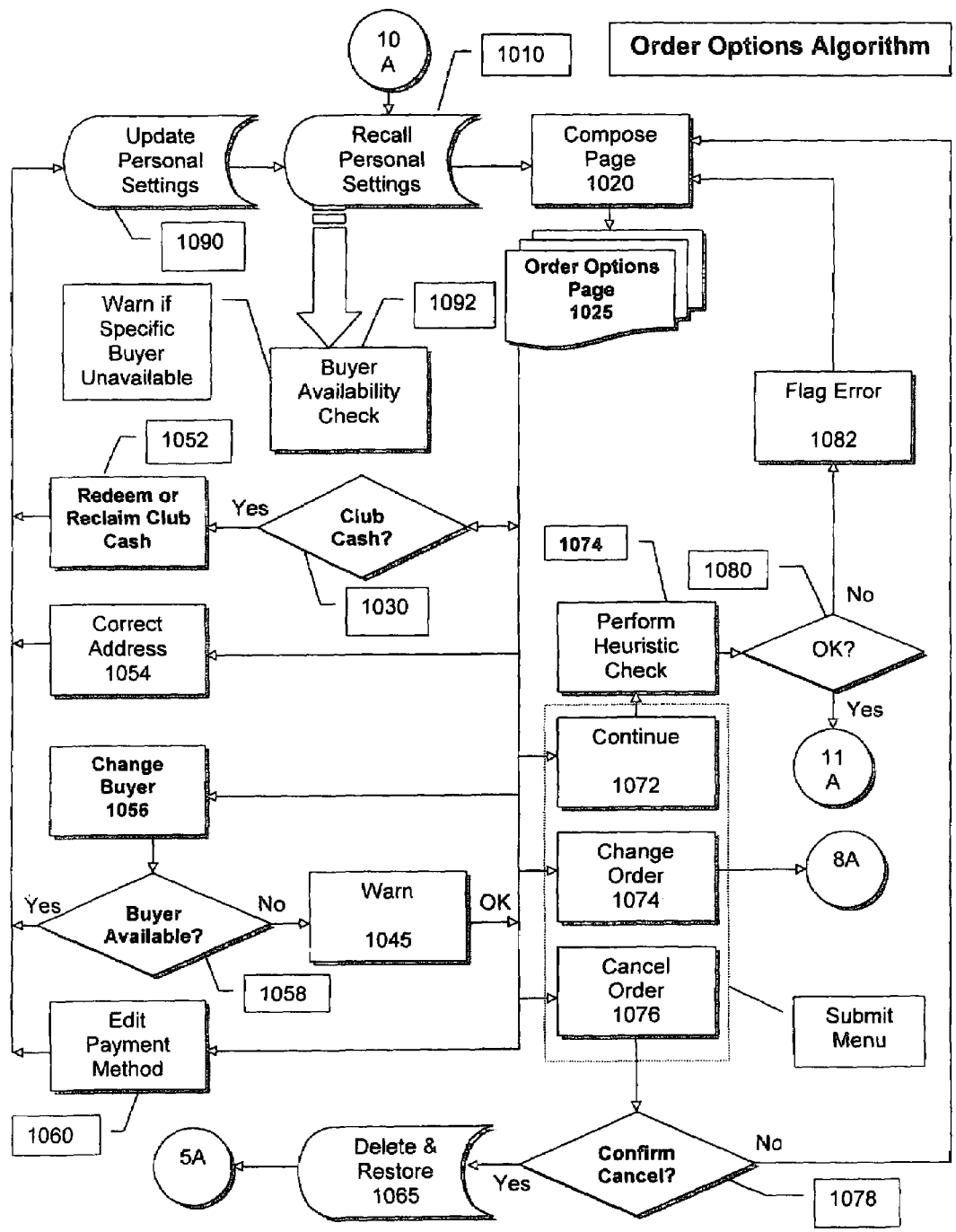
FIG. 10 is a flow chart illustrating the Order Options features of the Club described in the preferred embodiment of the present invention.

When the Consumer Member is satisfied that the Buying Order is complete, he or she may choose to purchase the items listed in the Order, by means of 820. Turning to FIG. 10, once this happens, the Club presents the Consumer Member with an Order Preferences Web frame that shows previously registered details relevant to fulfillment of the order, 1025 via 1010 and 1020. In the preferred embodiment of the present invention these details comprise delivery address, preference, if any, of Buyer Member who will perform fulfillment, and method of payment. As part of the process of compiling the Buying Order summary, in recalling the Consumer Member profile, 1010, the Club determines whether the Club Buyer associated with the Consumer Member's profile is available to fulfill the Buying Order, 1092. Unless the Consumer Member has previously exercised the option of specifying a particular Club Buyer as part of his or her Preferences, 548, the associated Club Buyer will be the default, "Any Available Buyer". In the event that the Consumer Member has previously specified a preference for a particular Club Buyer, via 548, the Club Buyer associated with the Consumer Member will be the previously specified Club Buyer. In this case, the Club checks the availability of the specified Club Buyer and represents the availability of the specified Club Buyer to the Consumer Member in an informational message on the Buying Order summary page. This check may or may not involve consulting the specified Club Buyer directly, via the mobile, wireless network part of the Club, which includes equipment carried by the Club Buyer that enables him or her to interact remotely with the Club. The act of consulting the specified Club Buyer is referred to in the preferred embodiment of the present invention as a Buyer Alert. If the Club determines via direct consultation with the specified Club Buyer, or otherwise via a heuristic decision-making process, that the specified Club Buyer will not become available in time to meet the 30 Minute Fulfillment constraint, this fact is represented to the Consumer Member as a warning on the Buying Order summary, 1025. If the Club determines that the Club Buyer is available, this fact is represented to the Consumer Member as a confirmation message on the Buying Order summary, 1025. In the case that a preferred Club Buyer is unavailable to fulfill the present Buying Order, the Club will assign the default, "Any Club Buyer", to the fulfillment of the order. Default assignment by the Club for the purpose of fulfillment of the present Buying Order does not alter the preferred Club Buyer associated with the Consumer Member's profile in data persistence store.

The Consumer Member is allowed the option of defraying cost of the order by redeeming Club Cash, 1052, if any has been earned by, and remains in the account of, the Consumer Member as determined by the Club, 1030. In the preferred embodiment of the present invention, Club Cash is credit earned from time to time through Club-sponsored incentive programs. If the Consumer Member chooses to apply an amount of Club Cash to the present order, up to and including the amount available to the Consumer Member, 1052, the Club updates the Consumer Member profile in data persistence store, 1090, by decrementing the amount of Club Cash available to the Consumer Member and updating the Buying Order summary page via 1010, 1020 and 1025. The updated Buying Order summary page will reflect the application of Club Cash to the present Buying Order by showing a credit equivalent to the amount of Club Cash redeemed against the total amount of the order. By the same mechanism, 1052, Club Cash that has been applied to the present Buying Order can be reclaimed up to, but not beyond, the point that the Buying Order is subsequently dispatched to a Club Buyer for fulfillment. In the event that Club Cash has been redeemed against the present Buying Order, but before the Buying Order has been committed to fulfillment, if in the process of reviewing the Buying Order the Consumer Member changes his or her mind about the redemption, the Club provides a method of restoring the Consumer Member's Club Cash to the amount prior to redemption, via 1052 and 1090.

The Consumer Member can alter any of the details relevant to the fulfillment of the order by paths associated with each detail, as sketched for the purposes of the preferred embodiment of the present invention as indicated in FIG. 10; namely, 1054, whereby the Consumer Member can alter the delivery address for the order, subject to the constraint that the address must lie within the Member Area; 1056, whereby the Consumer Member can select a Club Buyer different than that presently associated with his or her profile; and, 1060, whereby the Consumer Member can alter the method of payment presently associated with his or her profile. In the event that the Consumer Member wishes to change the Club Buyer presently associated with his or her profile, 1056, and hence associated with the present Buying Order, the Club checks to confirm that the selected Club Buyer is available to fulfill the present Buying Order using the methods previously described. In the event that the Club Buyer preferred by the Consumer Member is not available to fulfill the present Buying Order, 1058-No, the Club informs the Consumer Member, 1045, which warning is effected in the preferred embodiment of the present invention by a Pop Up Window, as it's referred to in the art. The Consumer Member is invited to acknowledge the circumstance by clicking on a button labeled "OK" in the Pop Up Window, whereupon the advisory Pop Up Window is collapsed and the Consumer Member is returned to the Buying Order summary. In this event the previously assigned and presumably available Club Buyer remains associated with the present Buying Order.

Upon successful alteration of the detail of any Consumer Member preference via 1052, 1056 or 1058, the Preferences associated with the Consumer Member profile are updated in data persistence store, 1090, and the Buying Order summary page is reconstructed and redisplayed on the Consumer Member's browser via 1010, 1020 and 1025.

Once the Consumer Member has reviewed his or her preferences in regard to fulfillment of the order, he or she can instruct the Club to proceed in one (1) of three (3) ways: to continue with placement of the order, 1072; to modify the order, 1074; or to cancel the order, 1076. If the Consumer Member chooses to modify the Order, the Club returns the Consumer Member to the Buying Order, 810. If upon confirmation, 1078, the Consumer Member wishes to cancel the order, the order is deleted, 1065, any changes to the Consumer Member's profile occasioned by exercise of options 1052, 1054, 1056 and 1060 are reversed in the Consumer Member's profile, and the Consumer Member is returned to his or her Home Page, 510. If the Consumer Member chooses to continue with order placement, the Club performs a heuristic check of the information provided according to the Consumer Member's preferences, 1074 and 1080. If any of the information specified in the preferences related to the order violate heuristic rules, the Order Preferences Web frame is reconstructed with a notice indicating the nature of the violation(s), 1082 to 1020. Violations may include incomplete delivery address, unspecified payment option, etc.

Figure 11:
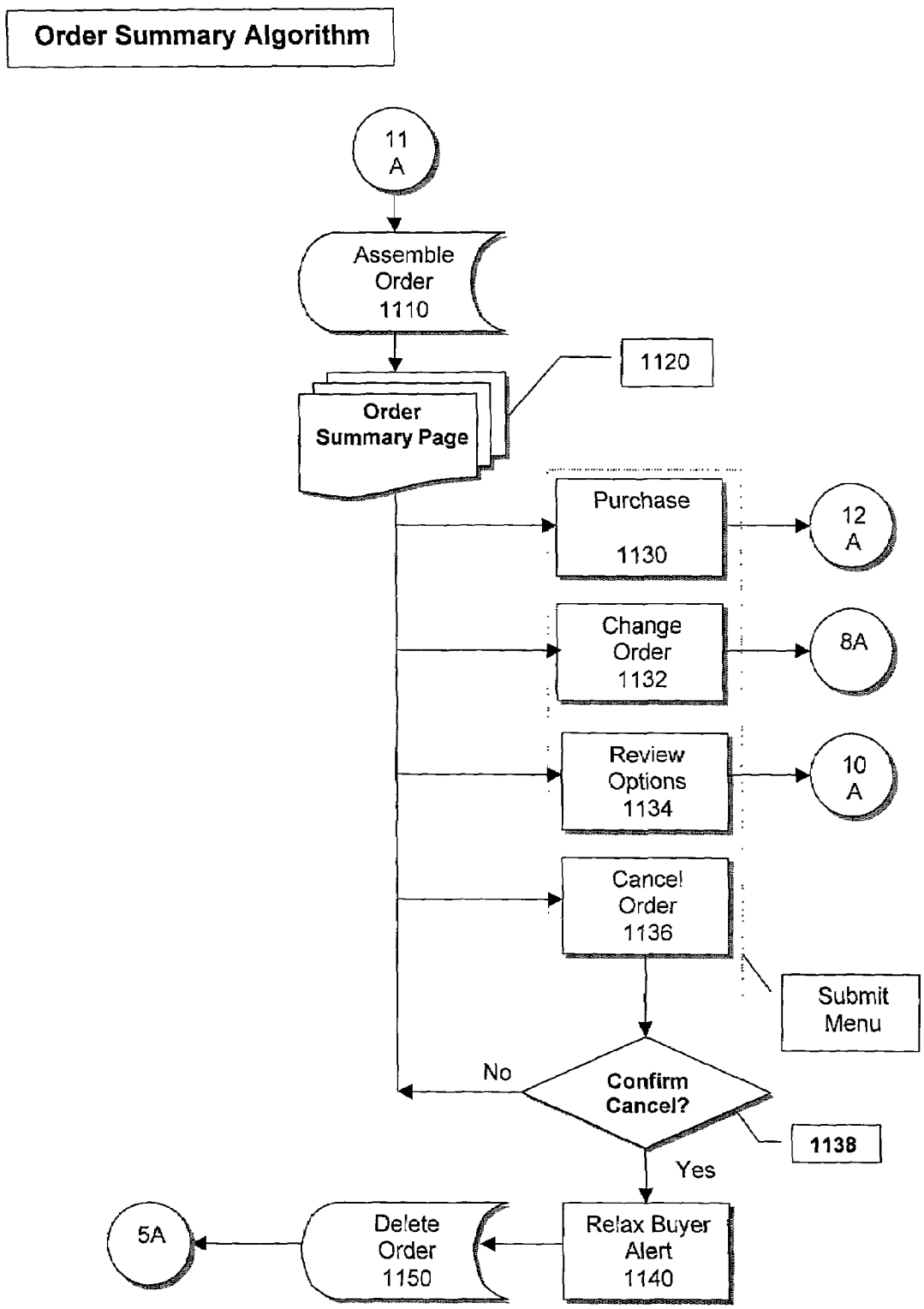
FIG. 11 is a flow chart illustrating the Order Summary features of the Club described in the preferred embodiment of the present invention.

Continuing to FIG. 11, if said preferences information is immediately, or eventually following correction, found not to violate heuristic rules, the Club presents the Consumer Member with a final summary of the Buying Order, together with preferences for delivery address, payment method and selected Buyer, if any; 1120 via 1110. Options available to the Consumer Member at this stage of the order process comprise the following: purchase, 1130; order modification, 1132; return to a review of preferences associated with the order, 1134; and order cancellation, 1136. In the event the Consumer Member wishes to modify the order, he or she is returned to the Buying Order, 810. If the Consumer Member wishes once again to review preferences associated with the Buying Order, the Club returns him or her to 1010. If the Consumer Member confirms his or her desire to cancel the order, 1138, the Club relaxes any Buyer alert, in the event a preferred Buyer Member were specified, 1140; deletes the Buying Order, 1150; and returns the Consumer Member to his or her Home page, 510.

Figure 12:
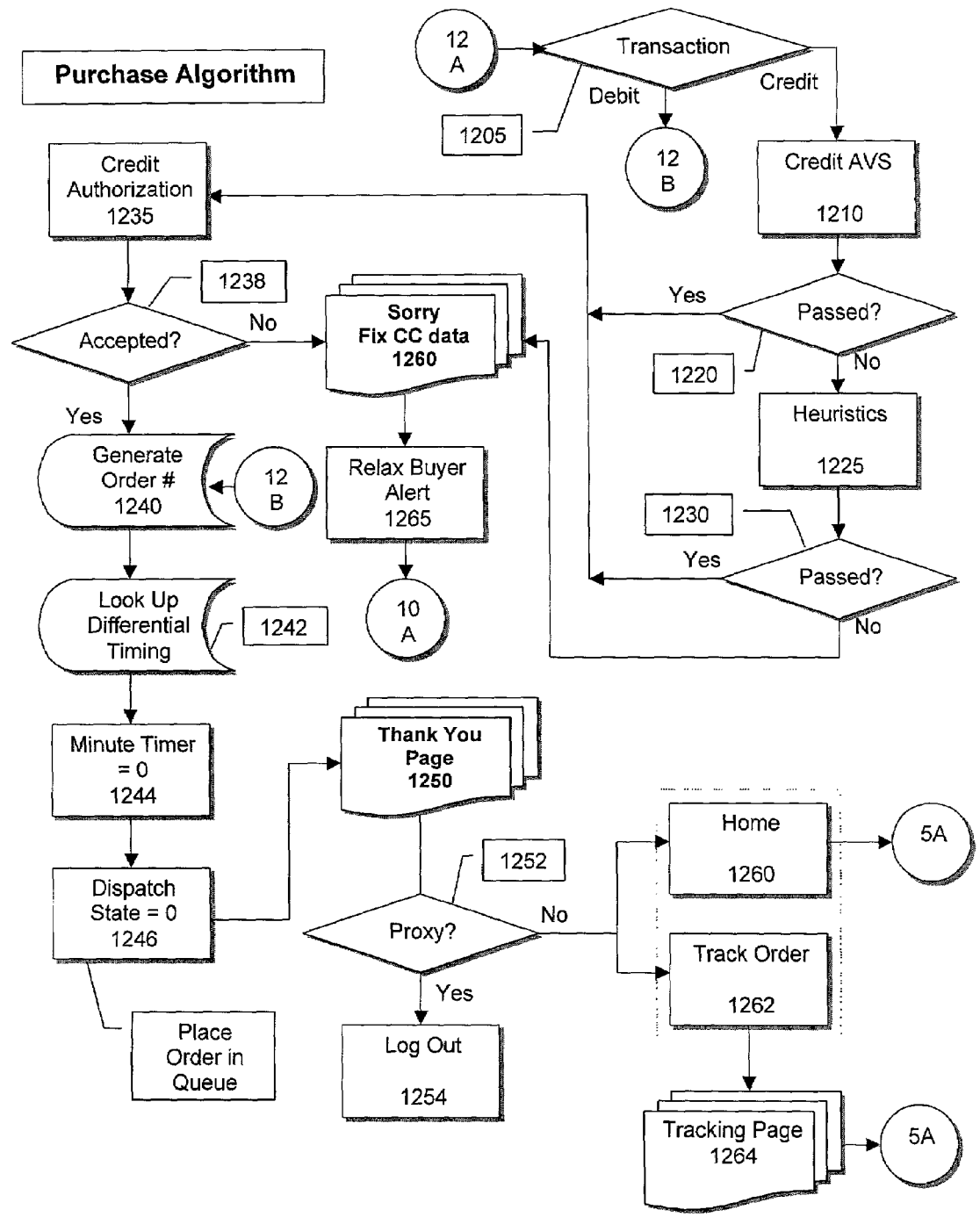
FIG. 12 is a flow chart illustrating the Purchase Algorithm features of the Club described in the preferred embodiment of the present invention.

In the event the Consumer wishes fulfillment of the Buying Order to proceed, in FIG. 12, the Club initiates dispatch of the order to the Buyer Member network by first confirming the credit-worthiness of the Consumer Member, if applicable, beginning at 1205. If the Club determines, via steps 1210 through 1238, which are routine in the practice of the art of consumer credit verification, that the Consumer Member is authorized to pay for the Buying Order by the preferred means, the Club generates an Order Number, 1240. In the preferred embodiment of the present invention, provision is made to bypass verification of Consumer Member credit worthiness in the event the preferred payment method is by debit card, via 1205. In the latter case, the Consumer Member will be expected to swipe a debit card through equipment provided by the Buyer Member fulfilling the Buying Order upon presentation of the fulfilled order to the Consumer Member. In this event, the purchase transaction is independent of payment management facilities and resources provided by the Club on behalf of the Buyer and Consumer Members, and will be performed via a banking transaction consummated between the Buyer Member and the Consumer Member.

Once the Club has associated an Order Number with the Buying Order, the Club initializes parameters associated with the order dispatch process, 1242 and 1244, and places the order in a dispatch queue, 1246. A Web form is constructed and presented to the Consumer Member, which advises the Consumer Member of the order number associated with his or her Buying Order, and thanking the Consumer Member for his or her custom, 1250. If the system detects at 1252 that the purchaser is a Proxy Member, the Member is logged off the system, 1254. Otherwise, options available to the Consumer Member upon presentation of the Thank You Web frame include returning to the Consumer Member's Home page, 1260, or tracking the order in the process of fulfillment, 1264 via 1262.

In the preferred embodiment of the present invention, a Geographic Information System, or GIS Engine, is a part of the Club that contains in object persistence store a record of the location, both addresses and latitudes and longitudes, of all retailers and Consumer Members known to the Club, and a means of displaying these locations on a map of the Member Area. The data required by the GIS is put in place by the Event Queue Engine, described later, which among other functions, also monitors location data transmitted by the Club's wireless network of mobile equipment carried by all Buyer Members, from Global Positioning System equipment attached to the Buyer Members' wireless networking equipment. The GIS Engine is therefore also capable of displaying the location of any active Buyer Member on the same map of the Member Area. The Club, via the GIS Engine, is therefore aware of the location of all active Buyer Members, and in particular, of the location of the Buyer Member to whom the current Buying Order has been dispatched. It is therefore possible for the Club, in the preferred embodiment of the present invention, to offer to Consumer Members the option of viewing a map of the Member Area that shows the dynamic position of the Buyer Member relative to the static location of retailers that the Buyer Member must visit for the purpose of fulfilling the Consumer Member's order, and the static location of the Consumer Member's delivery address. The Consumer Member may thus infer the progress of fulfillment of his or her Buying Order by visual inspection of the presented map of the Member Area, 1264.

Returning to FIG. 5, as previously stated, the Consumer Member presence comprises three (3) frames. In addition to the Home Page characterized by the predominating 30-Minute Mall center-right frame, the universally-present left-side frame presents a menu of hot links, represented as icons, enabling the Consumer Member to exercise number of purchase-related options. In the preferred embodiment of the present invention these purchase-related options comprise the following: jump to the pre-existing Buying Order, 810 via 530; schedule a Buyer Member to fulfill a courier order, 532, which is to say, the pickup and delivery of goods from one location to another within the Member Area, in return for a fee, but without involving a purchase transaction; view a Web page or sequence of Web pages offering Shelves of Retailer Member Specials, as previously defined, 534; view a Web page or sequence of Web pages offering Shelves of alcoholic beverages available from one or more Retailer Members, 536; and, view a Web page or sequence of Web pages offering Shelves of foods, 538, including restaurant meals and fast-foods available from retailers in the Member Area. Also available at the bottom of the left-side menu frame is a link to the Club general information articles, 310 to 380 as already defined in FIG. 3.

The universally-available top-frame of the Consumer Member presence presents a menu of hot links, represented as icons, enabling the Consumer Member to exercise number of navigation and Consumer Member presence-related options. In the preferred embodiment of the present invention these navigation and presence-related options comprise the following: return to the Consumer Member Home page, 540; review the Consumer Member's order history, 542, including tracking the current order in progress, as described previously; review Club News, 544; review Club membership and accumulated transaction-related fees scheduled for billing to the Consumer Member's registered credit facility, 546; review or adjust personal information, delivery address, preferred buyer or payment method, 548; originate feedback to the Club on a number of pre-conceived topics via forms appropriate to the topic, or in general on a topic of the Consumer Member's choosing, 550; and, access on-line help in regard to features of the Club or execution of options available to the Consumer Member, 552.

In regard to 550, the ability to post requests and provide feedback to the Club Administrator is an advantage of the preferred embodiment of the present invention. This feature offers the Consumer Member a method whereby needs specific to the Consumer Member, which the Club has no method of accommodating, can be communicated to the Club, further personalizing the Consumer Member presence. This feature comprises forms for general comments and suggestions, including improvements to the Club; for comments and complaints about Club Buyers; for cancellation of membership; for answers to questions not available in the on-line Help resource or via Company Information Sidebar; and for new member sponsorship when the Club offers Club Cash as an incentive for existing Consumer Members to sponsor new Consumer Members.

In the preferred embodiment of the present invention, retailers with profiles with the Clubs object persistence store can be accessed by the Consumer Member at his or her discretion via a grid of product categories, 525, as opposed to the default grid of retailer names, 520, that characterizes the Consumer Member's Home Page. Selection of an individual product category from the product category grid, 525, causes the Club to present to the Consumer Member a list of retailers, 527, some or all of whose products fall within the selected category. When a retailer is selected from the list, the Club presents the retailer presence to the Consumer Member as described previously.

Turning next to FIG. 17, in the preferred embodiment of the present invention, the Club provides a presence for all Buyer Members. The Buyer presence is provided primarily to allow the Buyer to review his or her order history, 1742, and tab, 1746, and to make requests of, or advisement's to, the Club, 1750. Non-operational snapshots of the 30-Minute Mall, 1720 through 1727, are available to familiarize the Buyer with the Club offering. General Club-related information articles are also accessible as described in FIG. 3.

Turning next to FIG. 16, in the preferred embodiment of the present invention, the Club provides a presence for all Retailer Members. The Retailer presence is provided primarily to allow the Retailer Member to upload objects associated with his or her presence as presented to Consumer Members, 1630 through 1634; to review his or her Registered Inventory and profile, 1638, comprising objects including coupons and Specials previously uploaded; and to review his presence as viewed by Consumer Members, 1620 through 1627, without the option of purchasing him- or herself. The universal top frame available to the Retailer Member allows him or her to review his or her order history, 1652, and tab, 1656, and to make requests of, or advisement's to, the Club, 1660. The Retailer Member can also review and update his or her personal information, 1658; avail him- or herself of retailer-specific help with Club operation, 1662. General Club-related information articles are also accessible as described in FIG. 3.

Figure 21:
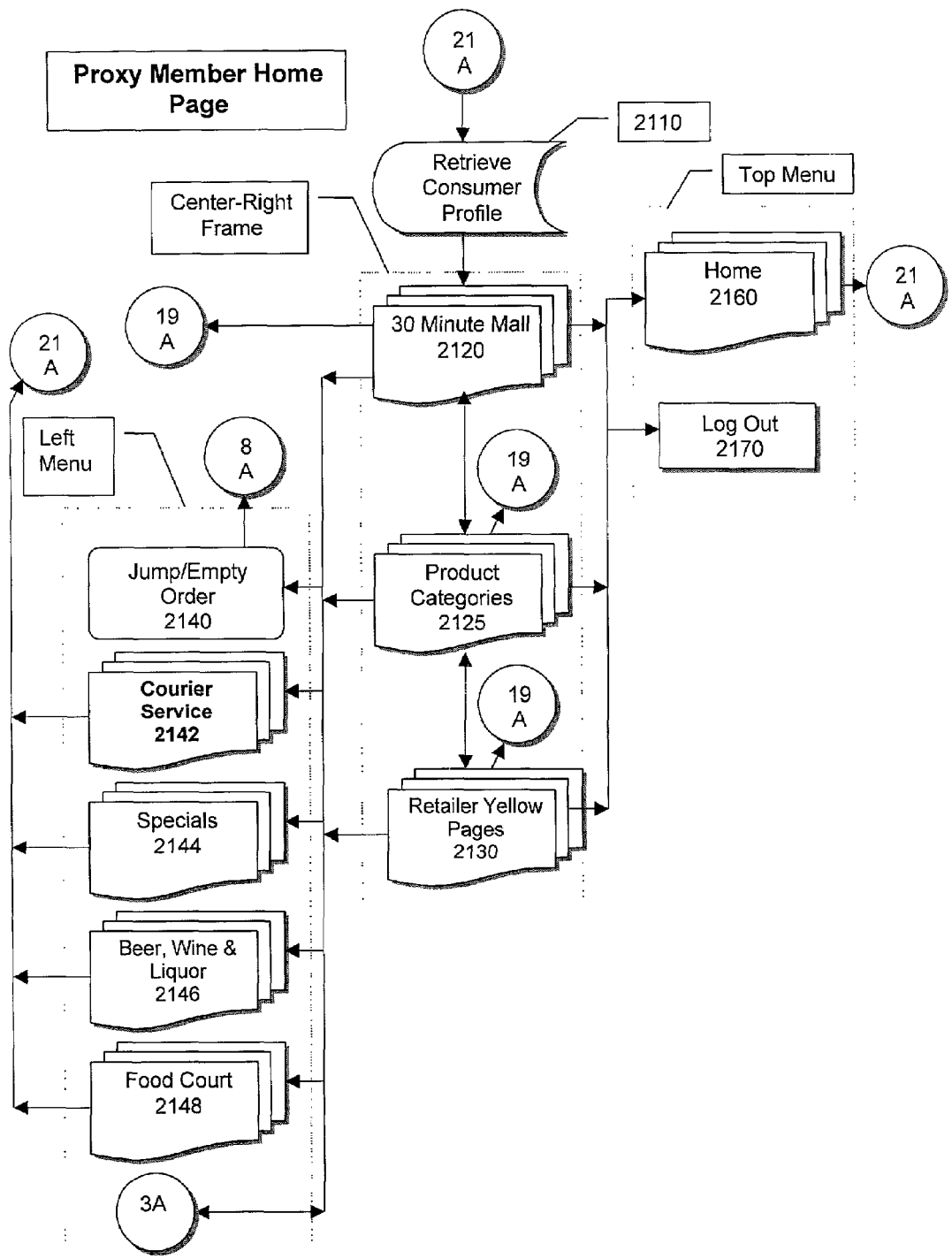
FIG. 21 is a flow chart illustrating navigation of the Proxy Member's home page in the preferred embodiment of the present invention.

Turning next to FIG. 21, in the preferred embodiment of the present invention, the Club provides a presence for all Proxy Members. The Proxy presence is provided only to allow the Proxy Member to construct and place Buying Orders on behalf of Consumer Members. The center-right Mall frames, 2120 through 2130, and left-side frame menu, comprising 2140 through 2148, are fully operational and functionally identical to those of a Consumer Member, as previously discussed. However, the only option afforded by the top frame is to log out of the Club, 2170, or to return to the Proxy Member's home page, 2160, once an order has been placed on behalf of the Consumer Member. Ordering on behalf of a Consumer Member is the only form of interaction allowed the Proxy Member, as previously described.

Figure 13:
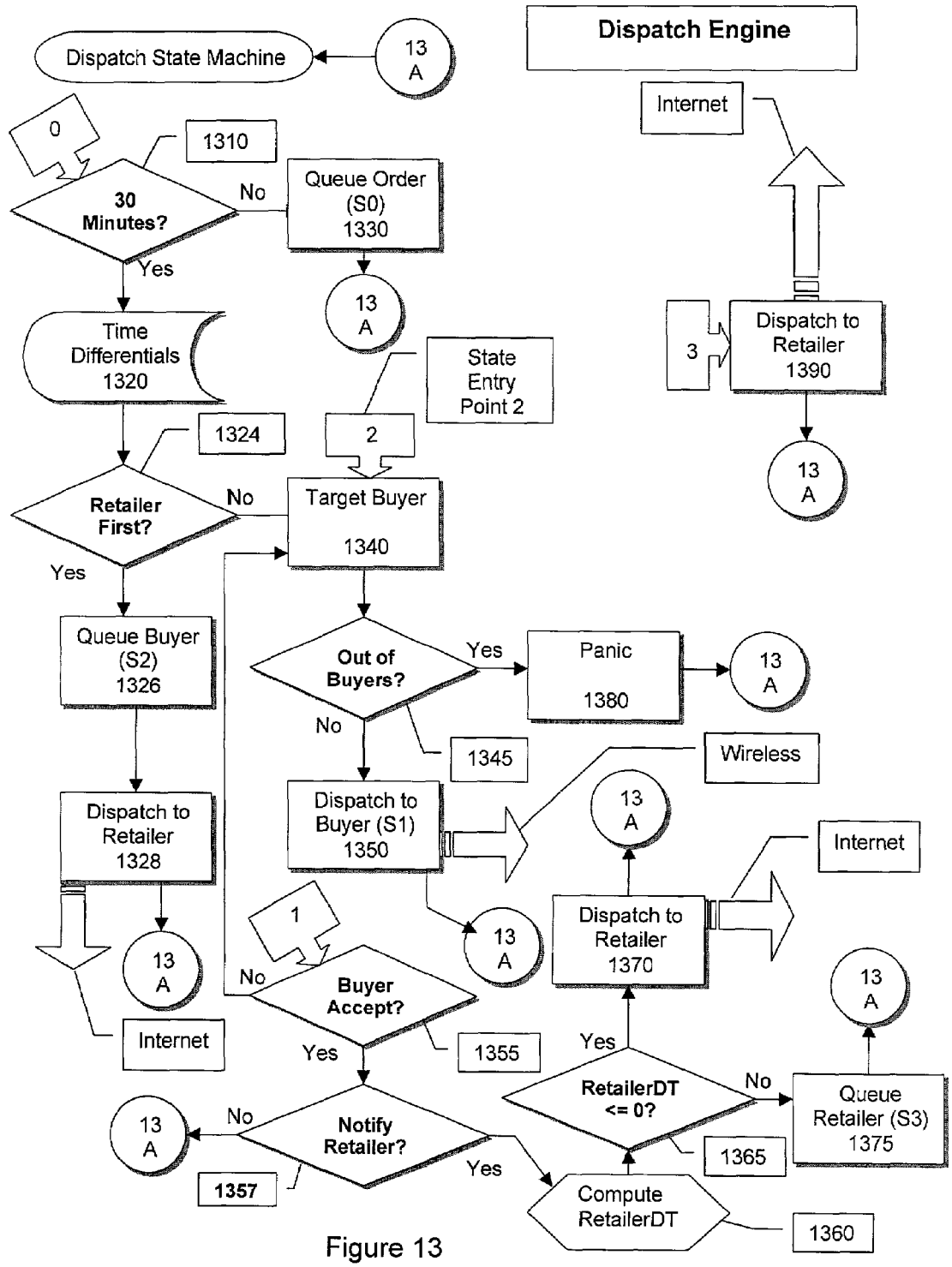
FIG. 13 is a flow chart illustrating the Dispatch State Machine Engine features of the Club described in the preferred embodiment of the present invention.

Turning next to FIG. 13, in the preferred embodiment of the present invention, a Dispatch State Machine ("DSM"), receives Buying Orders queued as a result of Consumer Member purchase decisions. The DSM decides, 1310, based upon the nature of the order, whether to queue it for later delivery, 1330, or to process it immediately. In the event the order is to be processed immediately, the DSM calculates any offset between notification of the Club Buyer and notification of the retailer, 1320. Differential notification times, or "or "pre-notification" of either the Club Buyer or the retailer, are supported in the preferred embodiment of the present invention to facilitate just-in-time handoff between Retailer Member and Buyer Member in consideration of efficiency. Some types of Buying Orders, especially those assembled by the Club Buyer at the retailer's place of business, require that the Club Buyer be notified of the Buying Order immediately, to improve the chances of meeting the 30 Minute fulfillment constraint. This type of differential applies in every case when the retailer in question is a non-member retailer, since non-member retailers, by definition, will not have been offered the option of pre-notification. When the Buying Order comprises items having very short assembly times, and the retailer is a Retailer Member who accepts pre-notification of the Buying Order for the purpose of pre-assembling the order, then it is more efficient to notify the Retailer Member before the Club Buyer. In this way the Club Buyer is not committed until the last available moment, and is free until that moment, for example, to complete fulfillment of a previous order.

Returning to FIG. 13, once Club has determined any differential in notification between the Club Buyer and the retailer, the Club acts upon the differential either by deciding, 1324-Yes, and 1326 and 1328, to first notify the retailer; or via 1324-No to first notify the Club Buyer, 1340. A dialogue is undertaken via wireless network with a Buyer selected either according to Consumer Member preference or by default, 1350 and 1345. If it transpires that a Buyer cannot be located to fulfill the order a condition of panic is declared, 1380, whereby a Buyer Supervisor is advised of the situation. In the normal event that a Buyer accepts to fulfill the order, 1355, the DSM determines whether the retailer needs to be notified at this stage, 1357. If so, the DSM determines whether the retailer should be notified immediately, 1360 through 1370, or whether retailer notification should be queued, 1375.

As a state machine in the preferred embodiment, the DSM accepts previously queued dispatch-related messages from the Club Event Queue Engine regarding the Buyer, 1340, and the Retailer Member, 1390.

Figure 14:
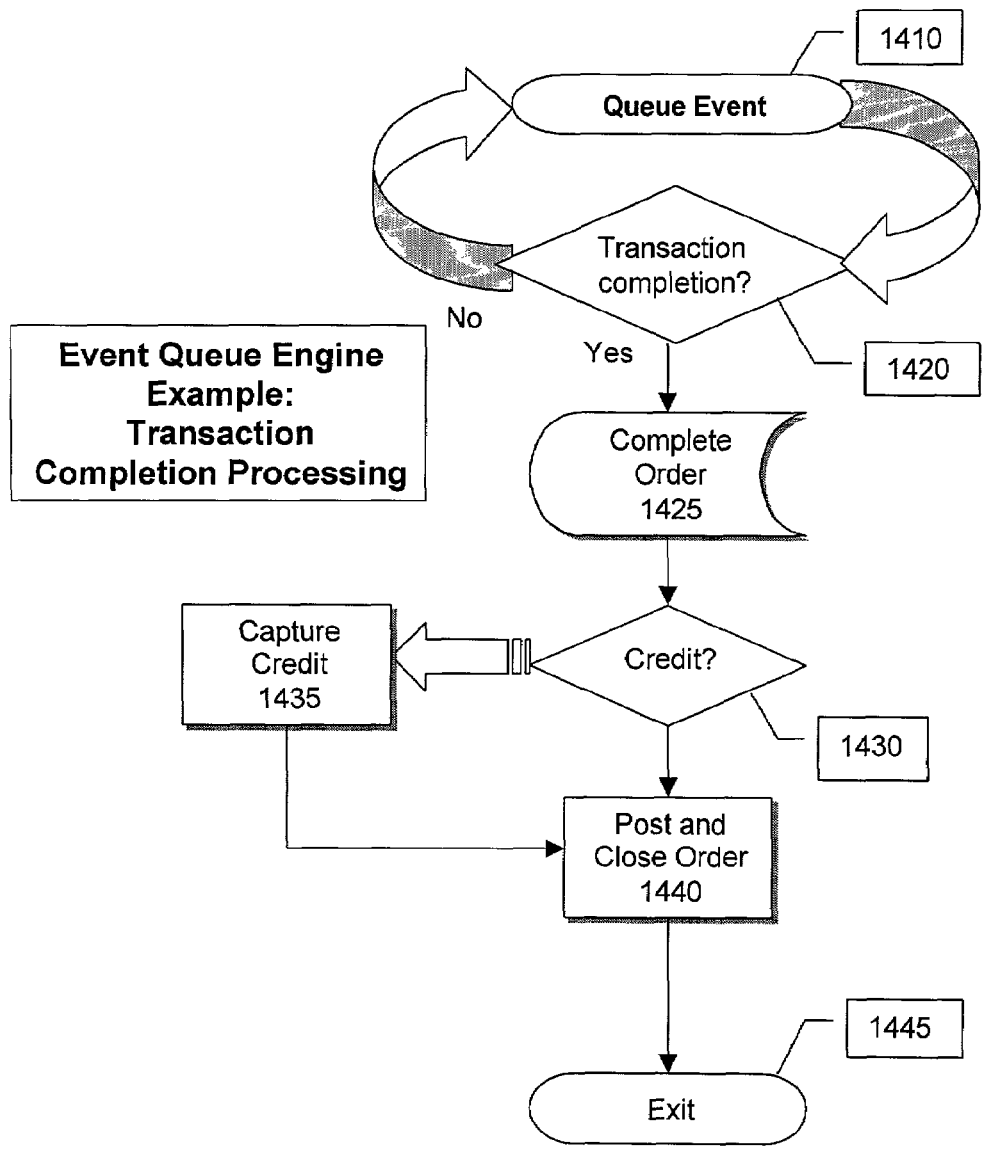
FIG. 14 is a flow chart illustrating the Event Queue Engine Transaction Completion Processing features of the Club described in the preferred embodiment of the present invention.

Turning finally to FIG. 14, in the preferred embodiment of the present invention, the Event Queue Engine transports messages between Club applications, delivering them to target applications according to a time-stamp embedded in the message. Typical Event Queue processing is illustrated in FIG. 14 for a Purchase Transaction Completion event, 1410 and 1420. When a Buyer completes fulfillment of a Consumer Member Buying Order, the Buyer notifies the Club of the fact via his or her wireless network equipment. This event is placed in the Event Queue until a Purchase Transaction Completion process can be spawned to process the event, 1425. In the case the system detects at 1430 that the transaction was a Club-sponsored credit transaction, the pre-authorized order is captured, 1435. Otherwise, and in addition, the Buying Order is closed and posted, 1440, to Club accounting for reconciliation with Consumer, Buyer and Retailer Order histories. The Purchase Transaction Completion part exits upon completion, 1445. It should be noted that in the preferred embodiment of the present invention, the Event Queue handles all inter-application communications, providing delays as appropriate in the case of time-stamped message delivery.

Completion of the Purchase Transaction is of vital importance to the Club, since it is at this stage that the Club debits transaction fees against all three parties to the transaction; namely, the retailer, the Club Buyer and the Consumer Member. In the preferred embodiment of the present invention, the transaction fee is the same for all three parties, and calculated according to formulae that may vary from time-to-time, to be relatively insignificant in comparison with the amount of the Buying Order. The relative insignificance of the transaction fee and its fixed nature together constitute an advantage of the preferred embodiment by virtue of the fact that the method encourages a higher volume of transactions.

In accordance with the Club business model as part of the preferred embodiment of the present invention, and aside from any additional advertising revenue negotiated with Retailer Members, or obtained by providing optional services to Retailer Members, these transaction fees, together with Club membership fees, are the intended to become the overriding source of regular income for the Club. All other amounts associated with a Buying Order, which comprise tariffs assigned to retailers based upon product category, extra item fees and gratuities, are outside the domain of the Club. They are collected and retained by the Club Buyer, as an independent businessperson. Aside from the extra-item fee, which is dictated by the Club in accordance with the Club business model and not negotiable, disposition of the tariff and gratuity are subject to negotiation by the Club Buyer with the retailer and Consumer Member, respectively. According to the Club business model in the present embodiment, however, tariffs and gratuities are constrained by the Club to fall within carefully-determined windows, so as not to jeopardize Buying Order volume, and hence transaction volume.

Furthermore, while not explicit in FIG. 14, which illustrates an example of the operation of the Event Queue Engine, it should be understood that an additional function of the Event Queue Engine is the monthly debiting by secure electronic means of Members' credit facilities, to collect fees owed the Club accumulated in arrears. Automatic monthly Member billing is an advantage of the preferred embodiment of the present invention, especially in light of the volume of transaction fees associated with Buying Order fulfillment, because bank charges associated with debiting Members accounts on a per-transaction basis would overwhelm Club revenues stemming from the Buying Order transaction. Automatic billing is also advantageous in that it improves compliance in the payment of fees owed the Club. The right of the Club to undertake monthly automatic billing is established under the terms of the agreement between the Club and its Members, upon Member subscription to the Club.

Furthermore, while not explicit in FIG. 14, which illustrates one example of the operation of the Event Queue Engine, and beyond the additional function of the Event Queue Engine in performing automatic monthly debiting of Members' accounts, the Event Queue Engine is responsible for monitoring and scheduling the availability of Club Buyers. It is an advantage of the preferred embodiment that the Club gather statistics regarding purchasing behaviour of its Consumer Members in order to predict numbers of Club Buyers required to meet 30-minute fulfillment requirements at all times, and that that implementation of this capability reside in a software program part of the Club, whose primary function is monitoring and scheduling events.

Furthermore, while not explicit in FIG. 14, which illustrates one example of the operation of the Event Queue Engine, and beyond the additional functions of the Event Queue Engine in performing automatic monthly debiting of Members' accounts and monitoring and scheduling Club Buyer availability, it should be understood that the Event Queue Engine is responsible for monitoring the location of active Club Buyers via Global Positioning System data transmitted at regular intervals by equipment carried by each Club Buyer. It is an advantage of the preferred embodiment of the present invention that this data be transmitted to the Geographic Information System part of the Club for the purpose of tracking Club Buyers. In the preferred embodiment, it is a further advantage that said tracking data is used to optimize the selection of a particular Club Buyer on the basis of his or her location relative to the retailer and the Consumer Member associated with a given Buying Order, toward improved likelihood of meeting the 30-minute fulfillment constraint.

Accordingly, it will be understood that the preferred embodiment of the present invention has been disclosed by way of example and that other modifications and alterations may occur to those skilled in the art without departing from the scope and spirit of the appended claims.

What is claimed is:

1. A method for implementing a computer-based product purchase and fulfillment club, comprising the steps of designating one or more geographic club member areas;

associating with each said club member area one or more consumer members who reside within said club member area and who must agree to pay a membership fee to said club;

associating with each said club member area one or more buyer members who must be prepared to work within said club member area and who must agree to pay a membership fee to said club;

associating with each said club member area one or more retailer members who must offer products for sale within said club member area and who must agree to pay a membership fee to said club;

providing means through an electronic communications network for said consumer members, buyer members and retailer members to access a club web site specific to said club member area and to interact with said club web site; providing means through an electronic communications network for said consumer members, buyer members and retailer members to each access an individual member web page located on said club web site and personalized using parameters specific to each such consumer member, buyer member and retailer member;

providing means through software programming for said retailer members to offer one or more products for sale on said club web site to said consumer members;

providing means through software programming for said consumer members to purchase products offered for sale on said club web site;

providing means through software programming for said buyer members to be notified of purchases made by said consumer members and to offer to said retailer members to fulfill said purchases; and fulfilling said purchases by having said buyer members buy said products from said retailer members, deliver said products to said consumer members to a location within said club member area within approximately thirty (30) minutes of said purchase, and collect a payment from said consumer members.

2. The method of claim 1 further comprising the step of providing telephonic means for said consumer members to purchase products offered for sale at said club web site.

3. The method of claim 2 further comprising the step of providing means through software programming for said consumer members to track the progress of fulfillment of their purchases.

4. The method of claim 3 further comprising the step of providing means through software programming for said consumer members, retailer members and buyer members to compose and post in said club web site comments regarding any element of said club or club member area.

5. The method of claim 4 further comprising the step of maintaining on said club web page a schedule of fees that may be charged by said retailer members and buyer members to said consumer members and by said retailer members to said buyer members.

6. The method of claim 5 wherein said membership fees are paid to said club via secure funds transfer over the World Wide Web from debit facilities.

7. The method of claim 4 further comprising the step of determining a geographic location of said club member areas based on the likelihood of enrolling a sufficient number of consumer, buyer members based upon demographics and statistics.

8. The method of claim 4 further comprising the step of determining a geographic location of said club member areas based on the availability of a wireless networking infrastructure in the candidate geographic areas.

9. The method of claim 4 further comprising the step of determining a geographic location of said club member areas based on the number and nature of potential retailer members likely to allow competition-based incentives to drive retailer member subscription within candidate geographic areas.

10. The method of claim 4 further comprising the step of determining a geographic location of said club member areas based on the availability of a site for rental or construction of a warehouse structure centrally located within candidate geographic areas.

11. The method of claim 4 further comprising the step of determining a geographic location of said club member areas based on refining its geometric shape to approximate a circle, by the use of extended ZIP codes falling within a distance from the center of a candidate geographic area.

12. The method of claim 4 further comprising the step of determining a geographic bounds of said club member areas based on transportation infrastructure to improve the likelihood of buyer members having the ability to deliver purchases within thirty (30) minutes to any point within a candidate geographic area.

13. The method of claim 4 further comprising the step of identifying and inducing potential consumer, buyer and retailer members through active recruitment programs.

14. The method of claim 4 further comprising the step of requiring potential consumer, buyer and retailer members to complete an electronic form located in said club web site and to utilize the data entered into said electronic form to screen said potential consumer, buyer and retailer members prior to their becoming associated with said club.

15. The method of claim 4 further comprising the step of providing secure means for a person designated by said club to assist consumer members in making purchases telephonically and to initiate said purchases on behalf of said consumer members.

16. The method of claim 4 further comprising the step of providing incentives to consumer, buyer and retailer members.

17. The method of claim 16 wherein said incentives to retailer members are based on competition between potential and existing retailer members.

18. The method of claim 17 wherein said incentives are purchase credits awarded to consumer members who sponsor persons who become consumer members of said club.

19. The method of claim 17 wherein said incentives to buyer members are services designed to allow said buyer members to become independent business persons.

20. The method of claim 4 further comprising the step of replicating on said club web site product information stored on a retailer member's computer.

21. The method of claim 20 further comprising the step of charging and collecting a fee from retailer members for said product information replication.

22. The method of claim 4 further comprising the step of placing advertisements on said club web site, specific to products of one or more retailer members, and collecting a fee from said retailer members for said advertisements.

23. The method of claim 4 further comprising the step of providing means through software programming for said consumer members to search for products by designating specific retailer members within the same club member area whose products they wish to limit their search to and displaying only products available from the selected retailer members.

24. The method of claim 4 further comprising the step of providing means through software programming for said consumer members to search for products available from said retailer members in the same club member area by selecting a product category.

25. The method of claim 4 further comprising the step of providing means through software programming for said consumer members to search for products by first preparing a shopping list and then displaying to said consumer member products that match the list which are available from retailer members in the same club member area.

26. The method of claim 4 further comprising the step of designating one or more buyer members "active" based on a schedule of expected purchase activity during the designation period, and requiring any such designated buyer member to fulfill said purchases made during its period of designation.

27. The method of claim 26 further comprising the step of selecting by use of a formula a single "active" buyer member to fulfill an order when multiple "active" buyer members have been designated.

28. The method of claim 27 wherein the factors considered in said formula include the preferences of said consumer and retailer members involved in the subject order; the ability of the buyer member to transport the purchased product; the location of said buyer member in relation to the locations of said consumer and retailer members involved in the subject order and; the ability or willingness of said buyer member to fulfill the subject order.

29. The method of claim 4 further comprising the step of notifying buyer members of purchases made by said consumer members through wireless communication means.

30. The method of claim 4 further comprising the step of implementing a Geographic Information System ("GIS") incorporating real-time Global Positioning System ("GPS") data provided through wireless means by buyer members which enables consumer members to track the exact location of ordered products.

31. A method for implementing a computer-based product purchase and fulfillment club, comprising the steps of designating one or more geographic club member areas;

associating with each said club member area one or more consumer members who reside within said club member area and who must agree to pay a to membership fee to said club;

associating with each said club member area one or more buyer members who must be prepared to work within said club member area and who must agree to pay a membership fee to said club;

associating with each said club member area one or more retailer members who must offer products for sale within said club member area and who must agree to pay a membership fee to said club;

providing means through an electronic communications network for said consumer members, buyer members and retailer members to access a club web site specific to said club member area and to interact with said club web site; providing means through an electronic communications network for said consumer members, buyer members and retailer members to each access an individual member web page located on said club web site and personalized using parameters specific to each such consumer member, buyer member and retailer member;

providing means through software programming for said retailer members to offer one or more products for sale on said club web site to said consumer members;

providing means through software programming for said consumer members to purchase products offered for sale on said club web site;

providing telephonic means for said consumer members to purchase products offered for sale at said club web site;

providing means through software programming for said buyer members to be notified of purchases made by said consumer members and to offer to said retailer members to fulfill said purchases;

fulfilling said purchases by having said buyer members buy said products from said retailer members, deliver said products to said consumer members to a location within said club member area within approximately thirty (30) minutes of said purchase, and collect a payment from said consumer members;

providing means through software programming for said consumer members to track the progress of fulfillment of their purchases;

to providing means through software programming for said consumer members, retailer members and buyer members to compose and post in said club web site comments regarding any element of said club or club member area;

maintaining on said club web page a schedule of acceptable fees that may me charged by said retailer members and buying members to said consumer members and by said retailer members to said buying members, wherein said membership fees are paid to said club via secure funds transfer over the World Wide Web from debit facilities pre-determined with each of said consumer, buyer and retailer members;

determining the geographic location of said club member areas based on the likelihood of enrolling a sufficient number of consumer, buyer members based upon demographics and statistics, on the availability of suitable wireless networking infrastructure in the candidate geographic areas, on the number and nature of potential retailer members likely to allow competition-based incentives to drive retailer member subscription within candidate geographic areas, on the availability of a suitable site for rental or construction of a warehouse structure centrally located within candidate geographic areas, and on refining its geometric shape to approximate a circle, by the use of extended ZIP codes falling within a pre-determined radius of the center of a candidate geographic area;

determining the geographic bounds of said club member areas based on adequate transportation infrastructure to improve the likelihood of buyer members having the ability to deliver purchases within approximately thirty (30) minutes to any point within a candidate geographic area;

identifying and inducing potential consumer, buyer and retailer members through active recruitment programs;

requiring potential consumer, buyer and retailer members to complete an electronic form located in said club web site and to utilize the data entered into said electronic form to automatically screen said potential consumer, buyer and retailer members prior to they becoming associated with said club;

providing secure means for a person designated by said club to assist consumer members in making purchases telephonically and to initiate said purchases on behalf of said consumer members;

to providing incentives to consumer, buyer and retailer members wherein said incentives to retailer members are based on competition between potential or existing retailer members, wherein said incentives are purchase credits awarded to consumer members who sponsor qualified persons who become members of said club, and wherein said incentives to buyer members are services designed to allow said buyer members to become independent business persons;

replicating on said club web site product information stored on a retailer member's computer and charging and collecting a fee from retailer members for said product information replication;

placing advertisements on said club web site, specific to products of one or more retailer members, and collecting a fee from said retailer members for said advertisements;

providing means through software programming for said consumer members to search for products by designating specific retailer members within the same club member area whose products they wish to limit their search to and displaying only products available from the selected retailer members;

providing means through software programming for said consumer members to search for products available from said retailer members in the same club member area by selecting a product category;

providing means through software programming for said consumer members to search for products by first preparing a shopping list and then displaying to said consumer member products that match the list which are available from retailer members in the same club member area;

designating one or more buyer members "active" based on a schedule of expected purchase activity during the designation period, and requiring any such designated buyer member to fulfill and purchases made during its period of designation;

automatically selecting by use of a formula a single "active" buyer member to fulfill an order when multiple "active" members have been designated wherein the factors considered in said formula include the preferences of said consumer and retailer members involved in the subject order; the ability of the buyer member to transport the purchased product; the location of said buyer member in relation to the locations of said consumer and retailer members involved in the subject order and; the ability or willingness of said buyer member to fulfill the subject order;

notifying buyer members of purchases made by said consumer members through wireless communication means; and implementing a Geographic Information System ("GIS") incorporating real-time Global Positioning System ("GPS") data provided through wireless means by buyer members which enables consumer members to track the exact location of ordered products.

* * * * *